(12) United States Patent
Fujii

(10) Patent No.: US 9,177,309 B2
(45) Date of Patent: Nov. 3, 2015

(54) ELECTRONIC SETTLEMENT METHOD, SYSTEM, SERVER AND PROGRAM THEREOF

(75) Inventor: Haruhiko Fujii, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 13/496,413

(22) PCT Filed: Sep. 22, 2010

(86) PCT No.: PCT/JP2010/066402
§ 371 (c)(1),
(2), (4) Date: Mar. 15, 2012

(87) PCT Pub. No.: WO2011/037134
PCT Pub. Date: Mar. 31, 2011

(65) Prior Publication Data
US 2012/0173421 A1 Jul. 5, 2012

(30) Foreign Application Priority Data
Sep. 24, 2009 (JP) .................................. 2009-219106

(51) Int. Cl.
*G06Q 40/00* (2012.01)
*G06Q 20/32* (2012.01)
(Continued)

(52) U.S. Cl.
CPC ............ *G06Q 20/322* (2013.01); *G06Q 20/027* (2013.01); *G06Q 20/10* (2013.01);
(Continued)

(58) Field of Classification Search
CPC ....... G06Q 10/00; G06Q 20/00; G06Q 30/00; G06Q 40/00
USPC ....................................... 705/3–44
See application file for complete search history.

(56) References Cited

U.S. PATENT DOCUMENTS 5,510,777 A 4/1996 Pilc et al.
5,963,647 A * 10/1999 Downing et al. ............... 705/39
(Continued)

FOREIGN PATENT DOCUMENTS

CN 1608267 A 4/2005
CN 1777911 A 5/2006
(Continued)

OTHER PUBLICATIONS

Hegarty, et al., "Study on the Security of Payment Products and Systems in the 15 Member States", Internal Market DG Final Report, Contract No. ETD/2002/B5-3001/C/11), Total pp. 48, Jun. 16, 2003.
(Continued)

*Primary Examiner* — Frantzy Poinvil
(74) *Attorney, Agent, or Firm* — Oblon, McClelland, Maier & Neustadt, L.L.P.

(57) ABSTRACT

A secure electronic settlement by an easy operation is enabled even with any terminal device and any network in any country. Balance information of a user, predetermined voice information that can identify a user, an arbitrary keyword, and a voiceprint are stored in advance in a database of a server in association with a telephone number of the user, and when a remitter user carries out remittance to a recipient user, the server sends out voice guidance including predetermined voice information registered in the database corresponding to the telephone number of a recipient terminal sent from the recipient terminal requesting the remittance or a telephone number of the recipient terminal inputted by the remitter carrying out the remittance to the recipient using a voice response function to a remitter terminal, thereby enabling intuitive confirmation of a recipient by a remitter.

2 Claims, 30 Drawing Sheets

(51) Int. Cl.
*G06Q 20/02* (2012.01)
*G06Q 20/10* (2012.01)
*G06Q 20/16* (2012.01)
*G06Q 20/20* (2012.01)
*G06Q 20/30* (2012.01)
*G06Q 20/36* (2012.01)
*G06Q 20/40* (2012.01)
*G06Q 20/42* (2012.01)

(52) U.S. Cl.
CPC ............ *G06Q20/1085* (2013.01); *G06Q 20/16* (2013.01); *G06Q 20/20* (2013.01); *G06Q 20/305* (2013.01); *G06Q 20/32* (2013.01); *G06Q 20/3223* (2013.01); *G06Q 20/363* (2013.01); *G06Q 20/4014* (2013.01); *G06Q 20/4018* (2013.01); *G06Q 20/40145* (2013.01); *G06Q 20/42* (2013.01)

(56) References Cited

U.S. PATENT DOCUMENTS

| | | | |
|---|---|---|---|
| 7,780,075 B2 * | 8/2010 | Cooper et al. | 235/379 |
| 8,032,435 B2 * | 10/2011 | Henoch | 705/35 |
| 8,510,188 B2 * | 8/2013 | Bulawa et al. | 705/35 |
| 2003/0233318 A1 | 12/2003 | King et al. | |
| 2005/0199709 A1 | 9/2005 | Linlor | |
| 2007/0011099 A1 | 1/2007 | Sheehan | |
| 2007/0027816 A1 | 2/2007 | Writer | |
| 2007/0055632 A1 | 3/2007 | Hogl | |
| 2007/0187484 A1 * | 8/2007 | Cooper et al. | 235/379 |
| 2009/0094163 A1 * | 4/2009 | Shastry | 705/64 |
| 2012/0116973 A1 * | 5/2012 | Klein et al. | 705/44 |
| 2013/0297494 A1 * | 11/2013 | Paintin et al. | 705/39 |
| 2014/0207679 A1 * | 7/2014 | Cho | 705/44 |
| 2014/0222681 A1 * | 8/2014 | Klein et al. | 705/44 |

FOREIGN PATENT DOCUMENTS

| | | |
|---|---|---|
| JP | 4 251379 | 9/1992 |
| JP | 7 87216 | 3/1995 |
| JP | 7 131527 | 5/1995 |
| JP | 2002 518749 | 6/2002 |
| JP | 2003 216824 | 7/2003 |
| JP | 2003-302999 | 10/2003 |
| JP | 2004-021748 | 1/2004 |
| JP | 3497799 | 2/2004 |
| JP | 2004-252588 A | 9/2004 |
| JP | 2005 512173 | 4/2005 |
| JP | 2005 275695 | 10/2005 |
| JP | 2006 48179 | 2/2006 |
| JP | 2006 524938 | 11/2006 |
| JP | 2007-042080 | 2/2007 |
| JP | 2007-048256 | 2/2007 |
| JP | 2007-317173 | 12/2007 |
| JP | 2009 503694 | 1/2009 |
| JP | 2009-211181 A | 9/2009 |
| WO | 98 36521 | 8/1998 |
| WO | 00 45349 | 8/2000 |
| WO | WO 01/39093 A1 | 5/2001 |
| WO | 01 97118 | 12/2001 |
| WO | 03 009243 | 1/2003 |
| WO | WO 03/046691 A2 | 6/2003 |
| WO | WO 2006/074115 A2 | 7/2006 |
| WO | WO 2006/124343 A2 | 11/2006 |
| WO | 2007 145500 | 12/2007 |
| WO | WO 2007/148320 A2 | 12/2007 |
| WO | WO 2008/033960 A2 | 3/2008 |
| WO | 2009 100477 | 8/2009 |

OTHER PUBLICATIONS

Pousttchi, et al., "Analyzing the Elements of the Business Model for Mobile Payment Service Provision", Proceedings of the Sixth IEEE International Conference on the Management of Mobile Business (ICMB 2007), Total pp. 6, Jul. 9-11, 2007.
Telephone Banking/Seven Bank, http://www.sevenbank.co.jp/persona/netbank/kaishi/tel_kaishi.html, Total 4 pages, (Searched on Aug. 26, 2009) (with English translation).
Mobile Phone Number Tranfer/Jibun Bank http://www.jibunbank.co.jp/pc/guidance/service/transfer/mobile_transfer/, total 4 pages, (Searched on Aug. 26, 2009) (with English translation).
International Search Report issued on Nov. 2, 2010 in PCT/JP10/66402 filed on Sep. 22, 2010.
Extended Search Report issued Aug. 26, 2013 in European Application No. 10 818 807.9.
Japanese Office Action issued Sep. 10, 2013, in Japanese Patent Application No. 2011-533004 (with English-language translation).
Combined Office Action and Search Report issued Feb. 28, 2014 in Chinese Patent Application No. 201080041266.0 (with English translation).
Decision of Refusal issued on Dec. 17, 2013, for corresponding Japanese Patent Application No. 2011-533004, with English translation.
Office Action issued Oct. 30, 2014 in Chinese Patent Application No. 201080041266.0 (with English language translation).
Extended Search Report issued Apr. 1, 2014, in European Patent Application No. 15151645.7.
Summons to Attend Oral Proceedings mailed Apr. 10, 2015, in European Patent Application No. 10818807.9.
Office Action mailed May 7, 2015, in Chinese Patent Application No. 201080041266.0 (with English-language translation).

* cited by examiner

ELECTRONIC SETTLEMENT METHOD, SYSTEM, SERVER AND PROGRAM THEREOF

TECHNICAL FIELD

The present invention relates to a technique of achieving an electronic small settlement that belongs to a network service using a public telephone network, the Internet, or the like, uses a common function of existing telephones, such as caller ID (a telephone number of a caller) notification, and further can be practiced commonly even with an IP telephone and any other terminal device.

BACKGROUND ART

Although, as a method of carrying out monetary settlement, such as a payment of an expense associated with a product purchase, there are conventionally a method of using regular bills and coins as they are and a method of using various magnetic cards, such as a credit card, a debit card, and a prepaid card, or a non-contact portable device, such as a non-contact IC card and a portable telephone with a non-contact IC, the former has problems of an increase in transaction costs associated with the necessity of change, an increase in a risk of being stolen, no applicability directly over a network, and the like, and the latter has problems of applicability only with magnetic cards and particular portable telephones, applicability only at a location provided with a dedicated reader for a non-contact portable device, no applicability to giving and receiving money between individuals, and the like.

In contrast, there have been conventionally techniques of achieving monetary settlement using a calling or communication function of a portable telephone or a fixed line telephone as follows.

(1) In Conventional Technique 1 (Non-Patent Literature 1), a depositor logs in by making a call from a touchtone telephone to a center of a bank and inputting an identification number (ID) and a personal identification number (PIN), and further inputting a number of a random number table on the backside of an ATM card to enable a desired transaction after that.

(2) In Conventional Technique 2 (Non-Patent Literature 2), an account is specified by inputting a telephone number of a portable telephone of a recipient from an application dedicated to transfer of a portable telephone to enable transfer to the account.

(3) In Conventional Technique 3 (Patent Literature 1), although a transfer processing device is arbitrary, in the event that a transferee is unprecedented, it is enabled to alert by making a call to a portable telephone of the transferor from a server.

(4) In Conventional Technique 4 (Patent Literature 2), by presenting a transfer history of telephone banking as guidance, it is enabled to transfer securely and conveniently to a transferee in the past.

(5) In Conventional Technique 5 (Patent Literature 3), it is enabled to transfer without going to a financial institution by making a call from a telephone connected to a terminal provided with an ID card reader to a host of a bank for connection, by inserting an ATM card of an account to withdraw a cash therefrom into an ID card reader to send the information, and also by inputting transferee information from a telephone or inserting an ATM card of a transferee account into an ID card reader to send it.

(6) In Conventional Technique 6 (Patent Literature 4), by registering information to identify a transferee and a transferee ID to a transferee file from a transfer terminal in advance to send the transferee ID from a touchtone telephone, it is enabled to transfer while specifying information to identify a transferee.

(7) In Conventional Technique 7 (Patent Literature 5), by sending a telephone number (caller ID) of a portable telephone as an ID from a terminal to a server and by sending the caller ID by calling from the portable telephone to the server, and if the ID matches with the caller ID, the server allows the terminal to log in and can provide a service.

PRIOR ART LITERATURE

Patent Literature

Patent Literature 1: Japanese Patent Application Laid Open No. 2006-48179
Patent Literature 2: Japanese Patent Application Laid Open No. 2003-216824
Patent Literature 3: Japanese Patent Application Laid Open No. H4-251379
Patent Literature 4: Japanese Patent Application Laid Open No. H7-87216.
Patent Literature 5: Japanese Registered Patent No. 3497799

Non-Patent Literature

Non-Patent Literature 1: "Seven Bank Telephone Banking", [online], Seven Bank, Ltd., [searched on Aug. 26, 2009], Internet <URL: http://www.sevenbank.co.jp/account/rb/tbguide.html>
Non-Patent Literature 2: "Jibun Bank Portable Phone Number Transfer", [online], Jibun Bank Corporation, [searched on Aug. 26, 2009], Internet <URL: http://www.jibunbank.co.jp/pc/guidance/service/transfer/mobile_transfer/>

SUMMARY OF THE INVENTION

Problems to be Solved by the Invention

However, in Conventional Techniques 1 through 7 described above, there have been problems as follows.

That is, in Conventional Technique 1, there is a problem on convenience of needing an ATM card every time, and since identification of a caller ID and the like is not carried out so as to allow utilization from any telephone, there is also a problem on security that a call from a third party may spoof to be recognized as an original person when the random number table is copied.

In Conventional Technique 2, it takes some care to launch a dedicated application and also there are problems that a portable telephone is needed that allows to use a JAVA (registered trademark) application or is equipped with a browser and it cannot be utilized from a fixed line telephone or the like, and it can be utilized only in countries where portable telephones are highly developed, such as Japan. In Conventional Technique 3, it offers an alert only and there is a problem of effectiveness. In Conventional Technique 4, there is a problem of measures against a new transferee. In Conventional Technique 5, there is a problem of needing an ID card reader.

In Conventional Technique 6, there is a problem that, when registering in advance, it cannot be able to prevent from registering an account of a malicious third party, by being deceived, as a transferee. In Conventional Technique 7, there are problems that, in the event that an identical ID has been sent from a plurality of terminals at the same time, it is not clear to which terminal to allow a log in and the like.

It is an object of the present invention to enable a secure electronic settlement by an easy operation over any network with any terminal device in any country.

Means to Solve the Problems

In the present invention, in order to solve the problems, an electronic settlement method between user terminals at least provided with a function of sending a unique ID of a user to a connection destination at a submission time carried out via a server provided at least with a database storing at least balance information of a user in association with the unique ID of the user, the method includes the steps of: receiving a reverse remittance request including at least a unique ID of a recipient user, a unique ID of a remitter user, and a billing amount from a recipient user terminal by the server; receiving confirmation information indicating an intention to accept remittance to the reverse remittance request from a remitter user terminal by the server; after receiving the confirmation information, updating balance information in a database corresponding to the unique ID of the remitter user and the unique ID of the recipient user in accordance with the billing amount by the server; and after updating the balance information, notifying the recipient user terminal of completion of money reception according to the reverse remittance request by the server.

In the present invention, in order to solve the problems, an electronic settlement method between user terminals at least provided with a function of sending a unique ID of a user to a connection destination at a submission time carried out via a server provided at least with a database storing at least balance information of a user in association with the unique ID of the user, the method includes the steps of: receiving a forward remittance request including at least a unique ID of a remitter user, a unique ID of a recipient user, and a remittance amount from a remitter user terminal by the server; and updating balance information corresponding to the unique ID of the remitter user and the unique ID of the recipient user in accordance with the remittance amount by the server.

Effects of the Invention

According to the present invention, when a remitter user carries out remittance to a recipient user, a server can carry out an update of balance information after receiving confirmation information indicating an intention to accept the remittance, and thus it becomes possible to reduce a possibility of incorrect remittance due to an error of inputting a unique ID or incorrect remittance to an account registered by a malicious third party.

DETAILED DESCRIPTION OF THE EMBODIMENTS

A detailed description is given below to embodiments of the present invention with reference to the drawings.

First Embodiment

Figure 1:
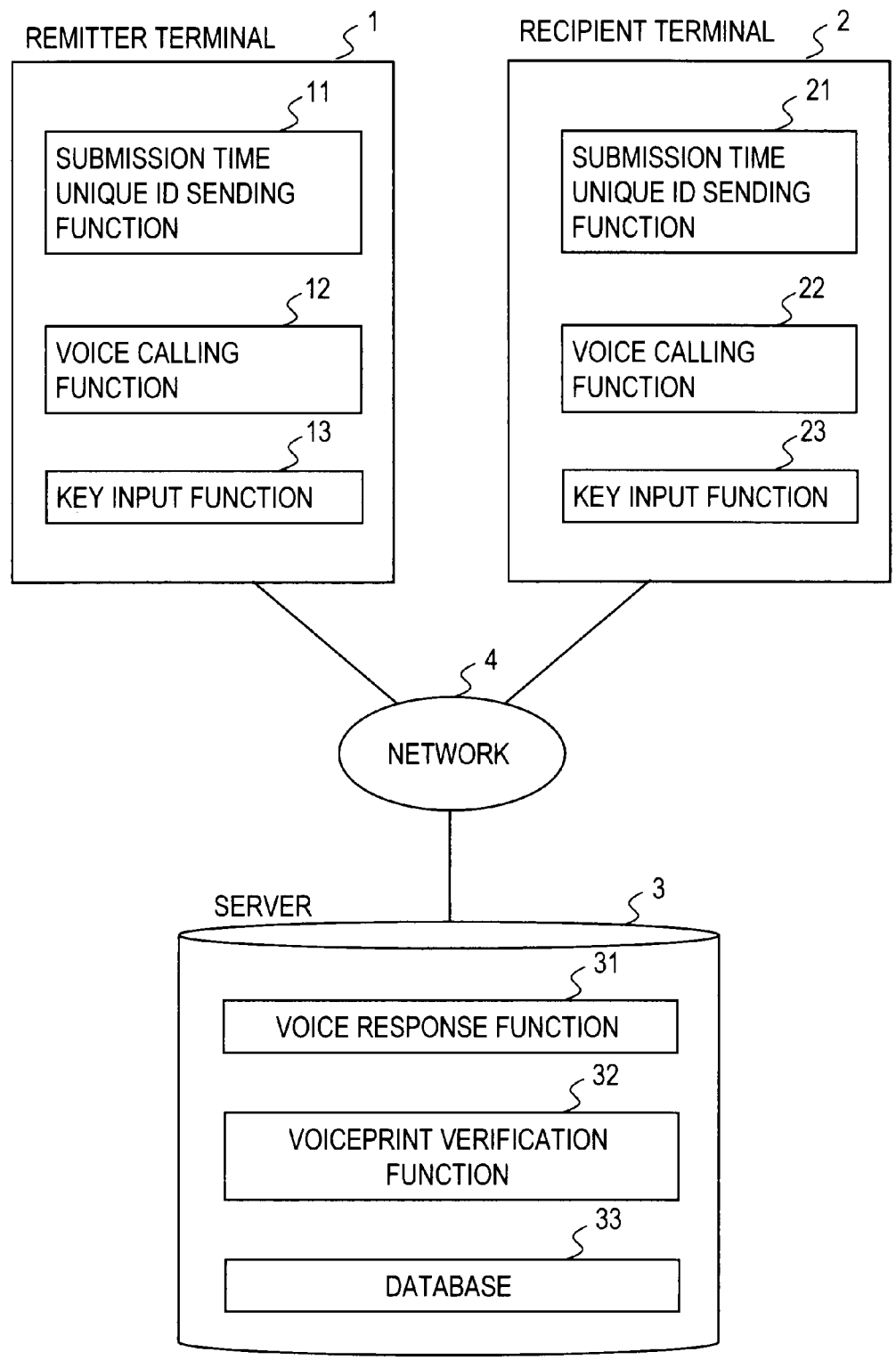
FIG. 1 is a block diagram showing a first embodiment of an electronic settlement system of the present invention.

FIG. 1 shows a first embodiment of an electronic settlement system of the present invention, and in the drawing, 1 denotes a remitter user terminal (hereinafter, a remitter terminal) used by a remitter user (hereinafter, a remitter), 2 denotes a recipient user terminal (hereinafter, a recipient terminal) used by a recipient user (hereinafter, a recipient), 3 denotes a server to provide a service of the present system, and 4 is a network to connect them.

The remitter (terminal) and the recipient (terminal) are convenient expressions for users (terminals) of the present system viewed from their positions when utilizing it, and each user (terminal) can be either of a remitter and a recipient. In the event of not distinguishing remitters and recipients, they are referred to simply as users (terminals).

The remitter terminal 1 and the recipient terminal 2 are made with a communication device, for example, a portable telephone or a fixed line telephone, respectively provided at least with submission time unique ID sending functions 11 and 21, voice calling functions 12 and 22, and key input functions 13 and 23.

The submission time unique ID sending functions 11 and 21 mean a function of sending a unique ID of a user to a connection destination at the time of submission (at the time of a connection request). The unique ID of a user in the present invention includes at least either one of a unique ID of a user him/herself or a unique ID of a user terminal, or also includes their combination.

The unique ID of a user him/herself is, for example, an ID of an IC card possessed by a user, and the unique ID of a user terminal is a telephone number for a regular portable telephone or fixed line telephone, and may also be a unique ID assigned in advance separately from the telephone number for a portable telephone equipped with a browser, and thus it may also be any information as long as the information allows to identify a user or a user terminal.

The submission time unique ID sending functions 11 and 21 to send a unique ID of a user terminal include, other than those, such as a portable telephone, storing a unique ID, here a telephone number (a caller ID) in the terminal itself and submitting a connection request signal (a call request signal) including the caller ID from the terminal itself to send the caller ID to a connection destination, those, such as a general fixed line telephone, not storing a caller ID in the terminal itself and not including a caller ID in the call request signal, either, while having a caller ID of the terminal identified in a subscriber network (for example, a public telephone network) to enable to send it to a connection destination.

The key input functions 13 and 23 are to send key information (for example, DTMF) showing a number of from "0" to "9" or a particular symbol (for example, "#", "*", or the like) in response to a user operation to a dial button or the like to a connection destination.

The server 3 is made with a known computer device connectable to a network, provided at least with a voice response function 31, a voiceprint verification function 32, and a database 33.

The voice response function 31 carries out detection of an incoming call and reception of a key input (recognition of DTMF or the like) from a user terminal, voice recognition, and playback of a recorded voice or a synthesized voice. The voice response function may also be, other than having the function built in the server itself, those utilizing a known voice response device installed in a subscriber network (for example, a public telephone network).

The voiceprint verification function 32 extracts a voiceprint from voice information inputted from the user terminal and carries out voiceprint verification between the extracted voiceprint and a voiceprint extracted from voice information of the user in advance and registered in the database 33 in advance corresponding to a caller ID of the user terminal.

The database 33 stores various types of information regarding a user, that is, other than a name of a user, a personal identification number, an arbitrary keyword and voice information when a user him/herself pronounces the keyword, balance information, information of a deposit and withdrawal history, and unprocessed case information (described later), predetermined voice information that can identify the user (for example, voice information when a user him/herself pronounces the name, and in the event that the user is a store or the like, a catchphrase, a commercial music, and the like of the store), voice information pronounced by the user him/herself, for example, a voiceprint extracted by the voiceprint verification function 32 from voice information when a user him/herself pronounces the keyword, biometric authentication information of a user him/herself, and the like in association with a unique ID of the user, here, a telephone number (a caller ID), which is a unique ID of the user terminal. In the event that the unique ID of a user is a unique ID of a user him/herself, a unique ID of the user terminal is stored together with the various types of information corresponding to the unique ID of a user, which is a unique ID of the user him/herself.

Here, the information of a deposit and withdrawal history is a collection of processed ones out of information regarding deposits or withdrawals, and the unprocessed case information means unprocessed ones (whether unprocessed or processed is indicated with a flag or the like) out of information regarding withdrawals while it is to be included in the history information as it is after being processed. The information regarding deposits includes at least an origin of a deposit and a deposit amount and may also include a date of a deposit, transaction details, and the like, and the information regarding withdrawals includes at least an origin of billing (a payee) and a withdrawal amount (a payment amount) and may also include a date of a withdrawal (a date of a payment), transaction details, and the like.

The network 4 is made with a communication network that can transmit a voice signal between a user terminal and a server, for example, a public telephone network including a portable telephone network and the Internet (it should be noted that, in the event of the Internet, in order to secure the security, communication is carried out via a VPN by an IPsec or an SSL).

Figure 2:
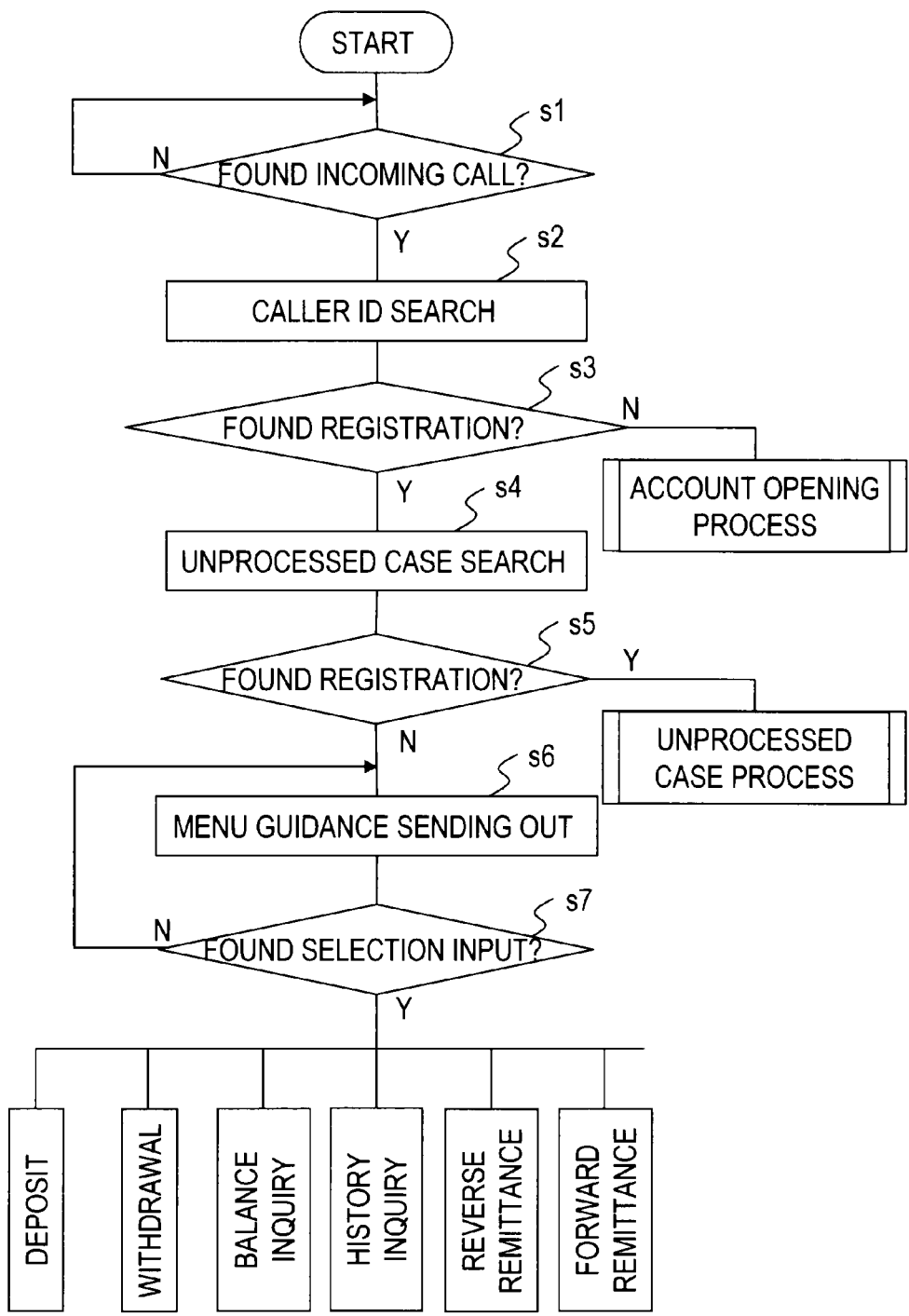
FIG. 2 is a flowchart of an initial process in a server of the first embodiment.
Figure 3:
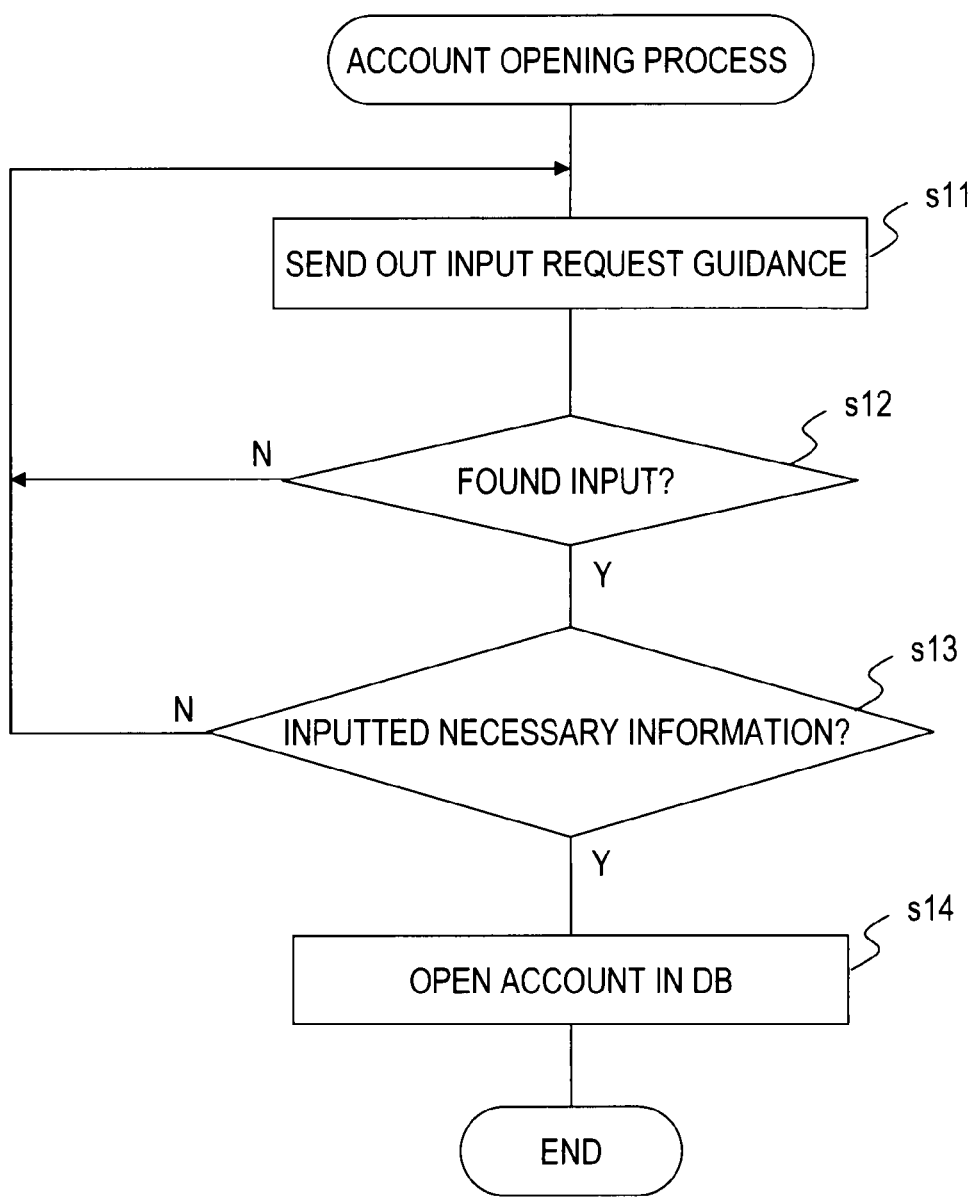
FIG. 3 is a flowchart of an account opening process in a server of the first embodiment.
Figure 4:
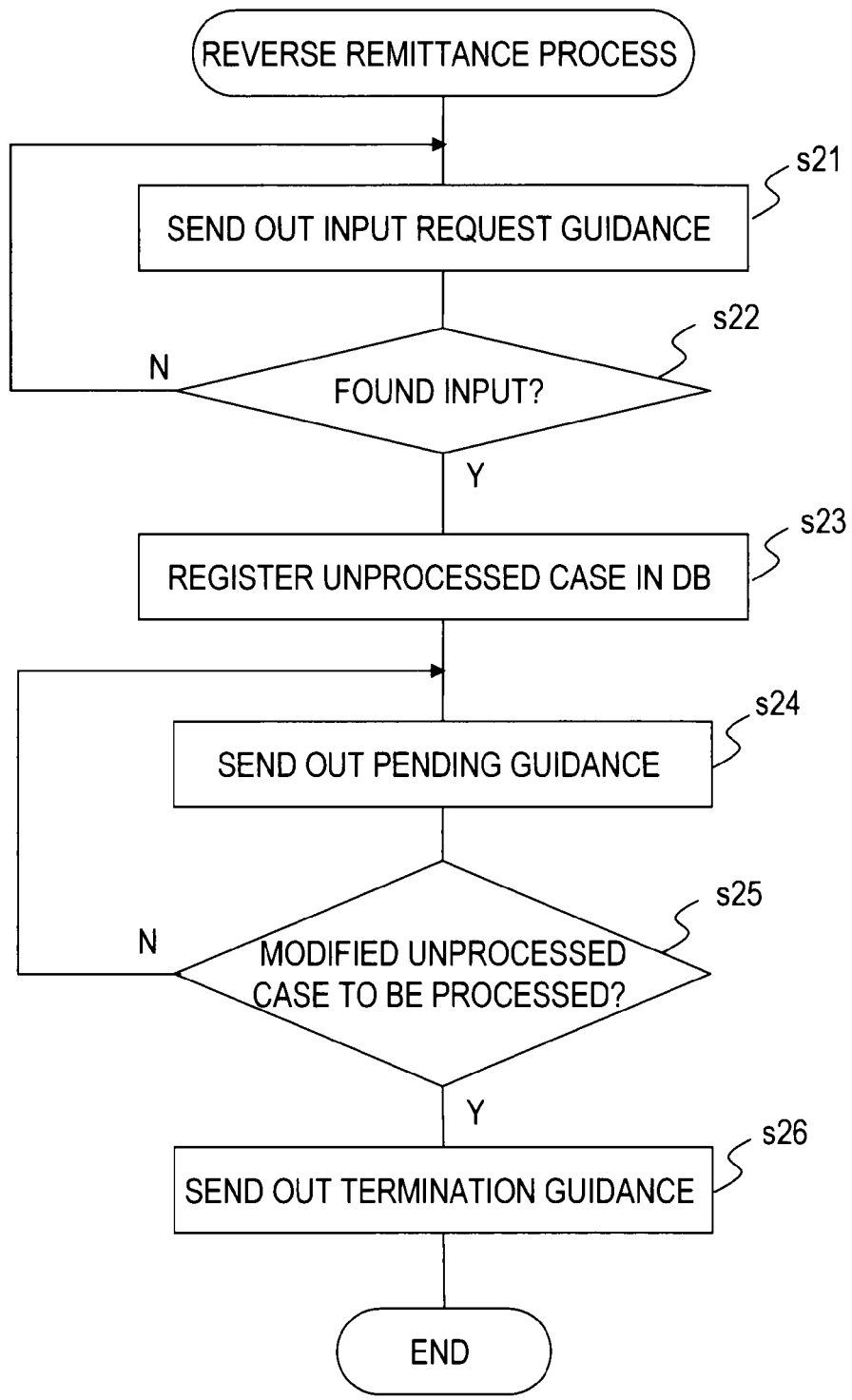
FIG. 4 is a flowchart of a reverse remittance process in a server of the first embodiment.
Figure 5:
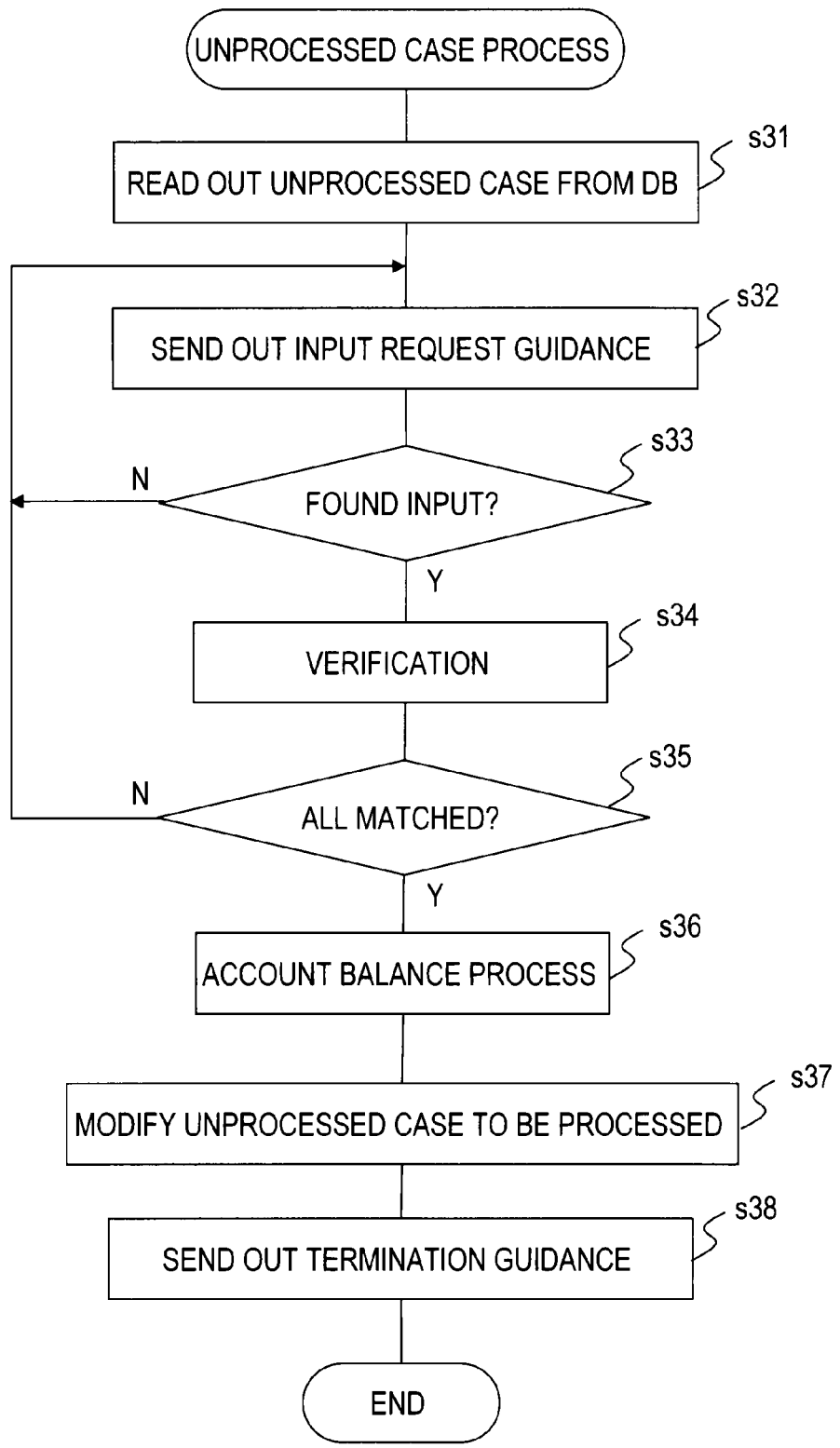
FIG. 5 is a flowchart of an unprocessed case (billing case) process in a server of the first embodiment.
Figure 6:
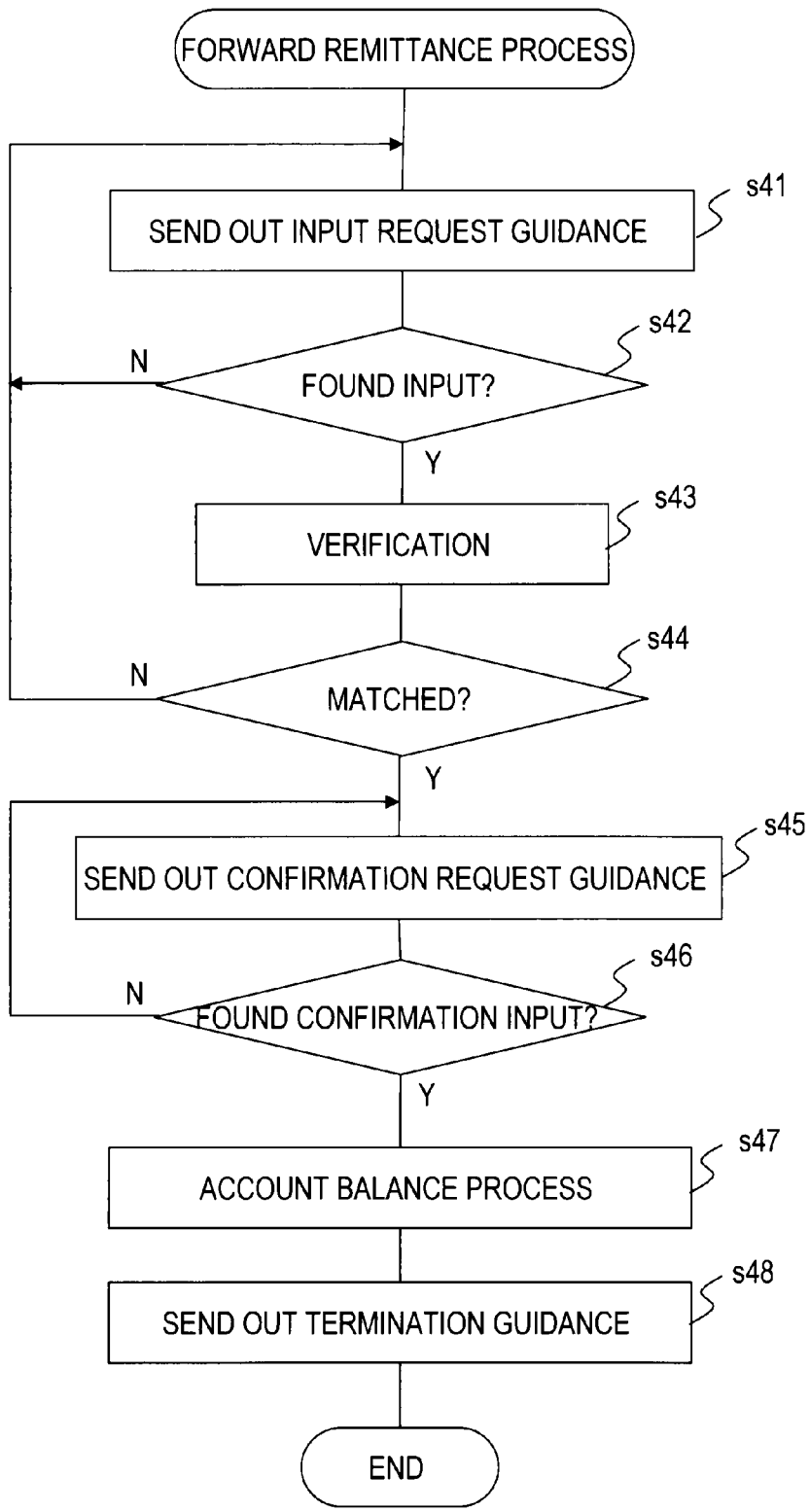
FIG. 6 is a flowchart of a forward remittance process in a server of the first embodiment.

FIGS. 2 through 6 show flows of various processes in the server 3, that is, FIG. 2 shows a flow of an initial process, FIG. 3 shows a flow of an account opening process, FIG. 4 shows a flow of a reverse remittance process, FIG. 5 shows a flow of an unprocessed case (billing case) process, and FIG. 6 shows a flow of a forward remittance process, and the server 3 is configured with respective means achieved by cooperation with a program, a CPU, a memory, and the like corresponding to the flows of these processes, and the above described voice response function 31, voiceprint verification function 32, and database 33.

A description is given below to a method of settlement by the present system together with details of the server.

[Initial Process]

As shown in FIG. 2, when the server 3 detects an incoming call from a user terminal via the voice response function 31 (s1), it investigates whether or not a caller ID included in the call request signal by the submission time unique ID sending function 11 or 21 of the user terminal is registered in the database 33 (s2), and if not registered (s3), it moves on to an account opening process as an incoming call from a terminal of a new user.

In contrast, if the caller ID is registered, the server 3 further investigates whether or not unprocessed case information corresponding to the caller ID is registered in the database 33 (s4), and if registered (s5), it moves on to an unprocessed case process.

If there is no unprocessed case information, the server 3 sends out voice guidance (menu guidance) offering processing items that can be selected using the voice response function 31 in a menu format to a user terminal (s6) to wait for a selection input by a voice or key input from a user terminal via the voice response function 31 (s7).

Here, the menu guidance is to present processing items, such as "deposit", "withdrawal", "balance inquiry", "history inquiry", "reverse remittance", and "forward remittance", as a voice together with a respectively different number or symbol in association with the processing items in advance. The selection input is carried out by sending out a number or a symbol corresponding to the processing item intended to be selected as a voice by the voice calling function 12 or 22 of the user terminal or sending out it as key information by the key input function 13 or 23.

[Account Opening Process]

In the event of moving on from the initial process to the account opening process, as shown in FIG. 3, the server 3 sends out voice guidance requesting an input of information necessary for an account opening using the voice response function 31 to the user terminal (s11) to wait for a voice input or a key input from a user terminal via the voice response function 31 (s12). Here, the information necessary for an account opening is a name of a user, a personal identification number, an arbitrary keyword, and predetermined voice information, biometric authentication information, and the like that can identify a user out of the information registered in the database 33 in association with a caller ID of a user described above. The keyword and the voice information need an input with a voice and the biometric authentication information needs an input from some dedicated reader.

In the event that all necessary information is inputted from a user terminal (s13), the server 3 registers, together with the inputted information, a voiceprint extracted via the voiceprint verification function 32 from (voice information of) an arbitrary keyword in the database 33 in association with the caller ID of the user, thereby opening an account of the user (s14). At the beginning of opening an account, other information, for example, balance information and history information are naturally 0 or blank.

It may also be enabled to make a call with an operator of the server 3 by inputting a particular key (for example, "*") during the voice guidance.

[Reverse Remittance Process and Unprocessed Case Process]

A case of selecting the "reverse remittance process" in a selection menu of the initial process is a case that a recipient requests monetary settlement, such as a payment of an expense associated with a product purchase, to a remitter through the present system, and in this event, an "unprocessed case process" to the remitter occurs at the same time.

Figure 7:
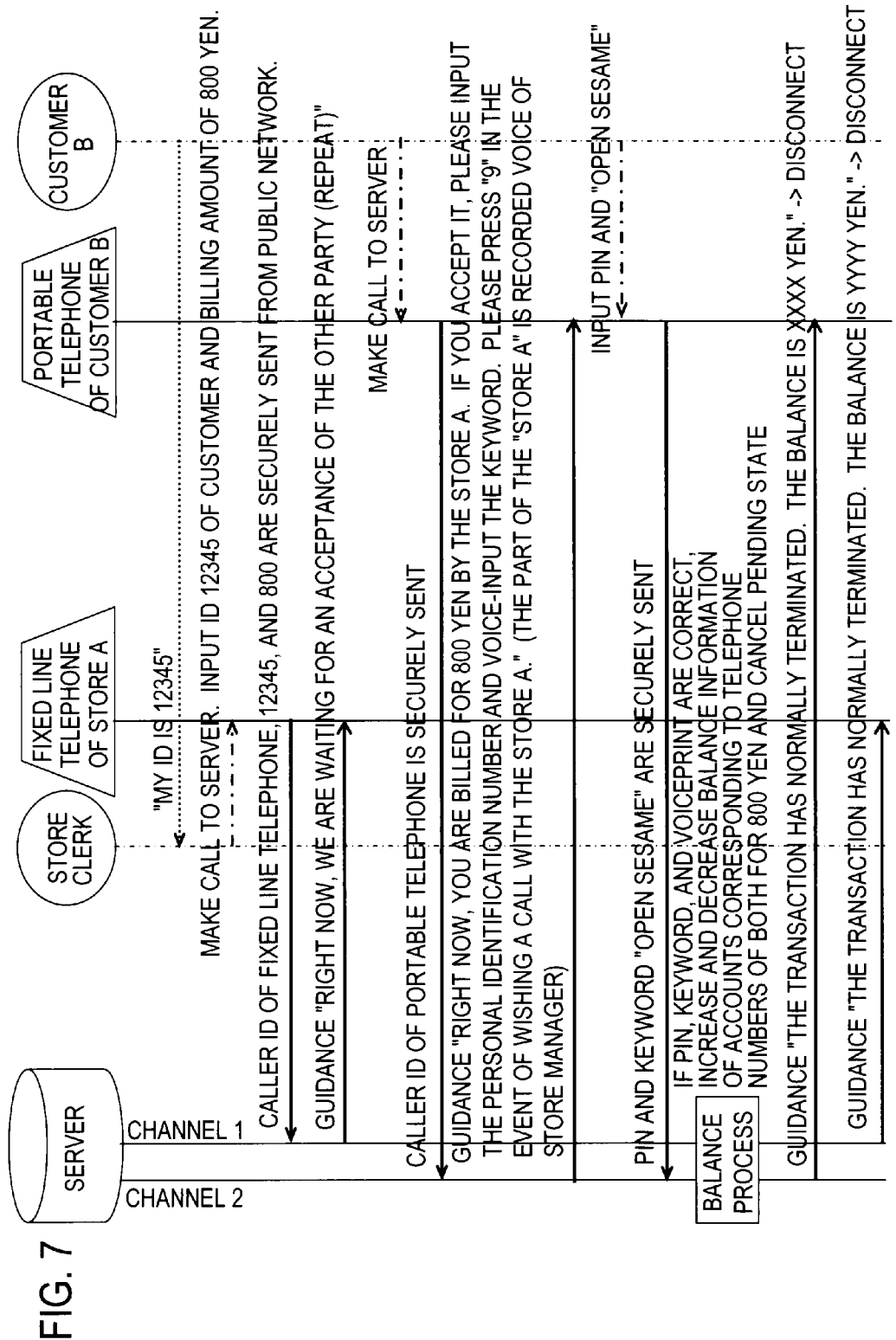
FIG. 7 is a sequence chart showing one example of a reverse remittance process and an unprocessed case process in the first embodiment.

A description is given below to a behavior in the event that the recipient is a store A that sells products and the recipient terminal 2 is a fixed line telephone of the store A, and the remitter is a customer B that purchases a product from the store A and the remitter terminal 1 thereof is a portable telephone, and further the network 4 is a public telephone network (including a portable telephone network) using a sequence chart of FIG. 7 together with flowcharts of FIGS. 4 and 5. In FIG. 7, an arrow in a solid line shows a flow of information between any terminal and the server, an arrow in a dash dotted line shows an operation to any terminal, and an arrow in a dotted line shows a direct conversation between the remitter and the recipient. Both the store (recipient) A and the customer (remitter) B are supposed to have completed the account opening process in advance.

At the time of a product purchase, the customer (remitter) B orally tells a telephone number (for example, "12345") of a portable telephone 1 of him/herself to a store clerk of the store (recipient) A. The store clerk of the store A that has heard the telephone number of the portable telephone 1 from the customer B makes a call (submits) to the server 3 from a fixed line telephone 2 of the store A. At this occasion, the caller ID of the fixed line telephone 2 is securely sent via a public telephone network 4.

The server 3 that has received the submission from the fixed line telephone 2 carries out the initial process described above and sends out menu guidance to the fixed line telephone 2 after going through steps s1 through s5 (s6), and the store clerk of the store A selectively inputs a "reverse remittance process" from the fixed line telephone 2 (s7).

When the "reverse remittance process" is selected, the server 3 sends out voice guidance requesting an input of a telephone number and a billing amount of the remitter to the fixed line telephone 2 using the voice response function 31 (s21) to wait for a voice input or a key input from the fixed line telephone 2 (s22).

When the store clerk of the store A inputs the telephone number (here, "12345") of the portable telephone 1 of the customer B and the billing amount (for example, 800 yen) by the voice calling function 22 or the key input function 23 of the fixed line telephone 2, the server 3 receives the information via the voice response function 31. At this occasion, the telephone number of the portable telephone 1 of the customer B and the billing amount are securely sent via the public telephone network 4.

The server 3 registers unprocessed ones out of information regarding withdrawals, in which the origin of billing is the user of the fixed line telephone 2 having selected the reverse remittance process, that is, the store A and the withdrawal amount is the received billing amount, that is, unprocessed case information, in the database 33 in association with the received telephone number of the portable telephone 1 (s23) and also sends out voice guidance indicating that it is in a state of waiting for an acceptance of the remitter (in a pending state), for example, "Right now, we are waiting for an acceptance of the other party." to the fixed line telephone 2 (s24).

The store clerk of the store A that has heard the guidance asks the customer B to make a call to the server 3, and the customer B makes a call (submission) to the server 3 with the portable telephone 1. At this occasion, the caller ID of the portable telephone 1 is securely sent via the public telephone network 4.

The server 3 that has received the submission from the portable telephone 1 carries out the initial process described above, and in this event, since the unprocessed case information is registered in the database 33 corresponding to the telephone number of the portable telephone 1, moves on to the "unprocessed case process" (s5). At this occasion, the connection between the fixed line telephone 2 and the server 3 and the connection between the portable telephone 1 and the server 3 are connections by separate lines (channels 1 and 2).

When moving on to the unprocessed case process from the initial process, the server 3 reads out the unprocessed case information from the database 33 (s31) and sends out voice guidance, which requests an input of confirmation information indicating an intention to accept remittance to the reverse remittance request and includes at least information regarding the recipient user and information regarding the transaction amount (withdrawal amount) registered in the database 33 corresponding to the telephone number of the fixed line telephone 2 having carried out a request corresponding to the unprocessed case information, to the portable telephone 1 (s32) using the voice response function 31 to wait for a voice input or a key input from the portable telephone 1 via the voice response function 31 (s33).

Here, the information regarding the recipient user is a name (designation) of the origin of billing. As voice information thereof, predetermined voice information that can identify the user (for example, voice information of the "store A" with a voice of a store manager) is used. The confirmation information indicating an intention to accept the remittance is a personal identification number and a keyword, or in addition to them, biometric authentication information out of information registered in association with the telephone number of the portable telephone 1 in the database 33. The keyword needs information by a voice input and the biometric authentication information needs information by a dedicated reader. The voice guidance may also include, other than them, information regarding an operation in the event of wishing a call with the origin of billing and the like.

Accordingly, contents of the voice guidance are, for example, "Right now, you are billed for 800 yen by the store A. If you accept it, please input the personal identification number and voice-input the keyword. Please press "9" in the event of wishing a call with the store A." (it should be noted that the part of the "store A" is the predetermined voice information).

When the customer B inputs the personal identification number by the key input function 13 of the portable telephone 1 and voice-inputs the keyword (for example, "open sesame") by the voice calling function 12, the server 3 receives the information via the voice response function 31. At this occasion, the personal identification number and the keyword of the customer B are securely sent via the public telephone network 4.

The server 3 verifies the personal identification number key inputted from the portable telephone 1 with the personal identification number registered in the database 33 corresponding to the telephone number of the portable telephone 1, verifies the keyword voice-inputted from the portable telephone 1 with the keyword registered in the database 33 corresponding to the telephone number of the portable telephone 1, and further extracts a voiceprint from the keyword voice-inputted using the voiceprint verification function 32 to verify it with the voiceprint registered in the database 33 corresponding to the telephone number of the portable telephone 1 (s34).

In the event that results of all of the verification indicate match (s35), the server 3 updates the balance information in the database 33 corresponding to the telephone number of the portable telephone 1 and the telephone number of the fixed line telephone 2 in accordance with the billing amount, that is, reduces the amount of the balance information in the database 33 corresponding to the telephone number of the portable telephone 1 and increases the amount of the balance information in the database 33 corresponding to the telephone number of the fixed line telephone 2 (s36). In the event that results of the verification don't indicate match, a reentry may also be sought at certain times.

After that, the server 3 deletes the registration of the unprocessed case information registered in the database 33 corresponding to the telephone number of the portable telephone 1, to be accurate, modifies the unprocessed one out of information regarding withdrawals registered in the database 33 corresponding to the telephone number of the portable telephone 1 to be a processed one (s37) and also sends out voice guidance notifying of termination of the transaction, for example, "The transaction has normally terminated. The balance is xxxx yen." using the voice response function 31 to the portable telephone 1 (s38) to disconnect the line.

Based on the deletion of the registration of the unprocessed case information registered in the database 33 corresponding to the telephone number of the portable telephone 1, to be accurate, the modification of the unprocessed case information to be a processed one (s25), the server 3 cancels the sending out of the voice guidance in a pending state to the fixed line telephone 2 and also sends out voice guidance notifying of termination of the transaction (completion of the request), for example, "The transaction has normally terminated. The balance is yyyy yen." to the fixed line telephone 2 using the voice response function 31 (s26) to disconnect the line.

It may be also possible to temporarily store the information regarding unprocessed withdrawals in a storage device separate from the database 33 in association with the unique ID of the user, and after processing, copy as information regarding a processed withdrawal (history information) in the database 33 and also delete it from the separate storage device.

Instead of the balance information, the database 33 may also store information regarding an account of a financial institution therein, and when results of all verification indicate match, the financial institution may be requested to withdraw and transfer an amount according to a billing amount to the account corresponding to the unique ID of the remitter user and the unique ID of the recipient user.

In steps s32 through s35 of authenticating a remitter, a part of the verification of the personal identification number, the keyword, and the voiceprint may also be omitted.

Furthermore, in the event of requesting to a large number of parties for a short period of time, the contracts may also be cancelled.

[Forward Remittance Process]

The case of selecting "forward remittance" in the selection menu of the initial process is a case of carrying out simple remittance (transfer) from a remitter to a recipient through the present system.

A description is given below to a behavior in the event that a remitter terminal 1 of a remitter (individual person) X is a portable telephone and a recipient terminal 2 of a recipient (individual person) Y is also a portable telephone using a sequence chart of FIG. 8 together with a flowchart of FIG. 6.

At the time of remittance, the recipient Y orally tells a telephone number (for example, "12345") of a portable telephone 2 of him/herself to the remitter X. The remitter X that has heard the telephone number of the portable telephone 2 from the recipient Y makes a call (submission) to the server 3 from a portable telephone 1 thereof. At this occasion, the caller ID of the portable telephone 1 is securely sent via the public telephone network 4.

The server 3 that has received the submission from the portable telephone 1 carries out the initial process described above and sends out menu guidance to the portable telephone 1 after going through steps s1 through s5 (s6), and the remitter X selectively inputs "forward remittance process" from the portable telephone 1 (s7).

When the "forward remittance process" is selected, the server 3 sends out voice guidance, which requests an input of the telephone number of the recipient, a remittance amount, and a personal identification number of the remitter X, to the portable telephone 1 using the voice response function 31 (s41) to wait for a voice input or a key input from the portable telephone 1 (s42).

When the remitter X inputs the telephone number (here, "12345") of the portable telephone 2 of the recipient Y, the remittance amount (for example, 800 yen), and the personal identification number of him/herself by the voice calling function 12 or the key input function 13 of the portable telephone 1, the server 3 receives the information via the voice response function 31. At this occasion, the telephone number of the portable telephone 2 of the recipient Y, the remittance amount, and the personal identification number are securely sent via the public telephone network 4.

The server 3 verifies the personal identification number inputted from the portable telephone 1 with the personal identification number registered in the database 33 corresponding to the telephone number of the portable telephone 1 (s43).

In the event that result of the verification indicates match (s44), the server 3 sends out voice guidance, which requests an input of confirmation information indicating an intention to accept remittance to the forward remittance request and includes at least information regarding the recipient user and information regarding the transaction amount registered in the database 33 corresponding to the telephone number of the portable telephone 2 of the recipient Y having carried out the forward remittance request using the voice response function 31, to the portable telephone 1 (s45) to wait for a voice input or a key input from the portable telephone 1 via the voice response function 31 (s46). In the event that results of the verification don't indicate match, a reentry may also be sought at certain times.

Here, the information regarding the recipient user is a name (designation) of the remittance destination. As voice information thereof, predetermined voice information that can identify the user is used. Although the confirmation information indicating an intention to accept the remittance is generally a personal identification number and a keyword out of information registered in association with the telephone number of the fixed telephone 1 in the database 33, here a particular key input (for example, "#") is to be used.

Accordingly, contents of the voice guidance are, for example, "Are you remitting 800 yen to Mr./Ms. Y? If this is correct, please press #." (it should be noted that the part of the "Y" is the predetermined voice information of the recipient Y).

When the remitter X carries out the particular key input for confirmation by the key input function 13 of the portable telephone 1, the server 3 receives the key information via the voice response function 31. At this occasion, the particular key information is securely sent via the public telephone network 4.

After that, the server 3 updates the balance information in the database 33 corresponding to the telephone number of the portable telephone 1 and the telephone number of the portable telephone 2 in accordance with the remittance amount, that is, reduces the amount of the balance information in the database 33 corresponding to the telephone number of the portable telephone 1 and increases the amount of the balance information in the database 33 corresponding to the telephone number of the portable telephone 2 (s47), and sends out voice guidance notifying of completion of remittance, for example, "The remittance has completed normally." using the voice response function 31 to the portable telephone 1 (s48) to disconnect the line.

Figure 8:
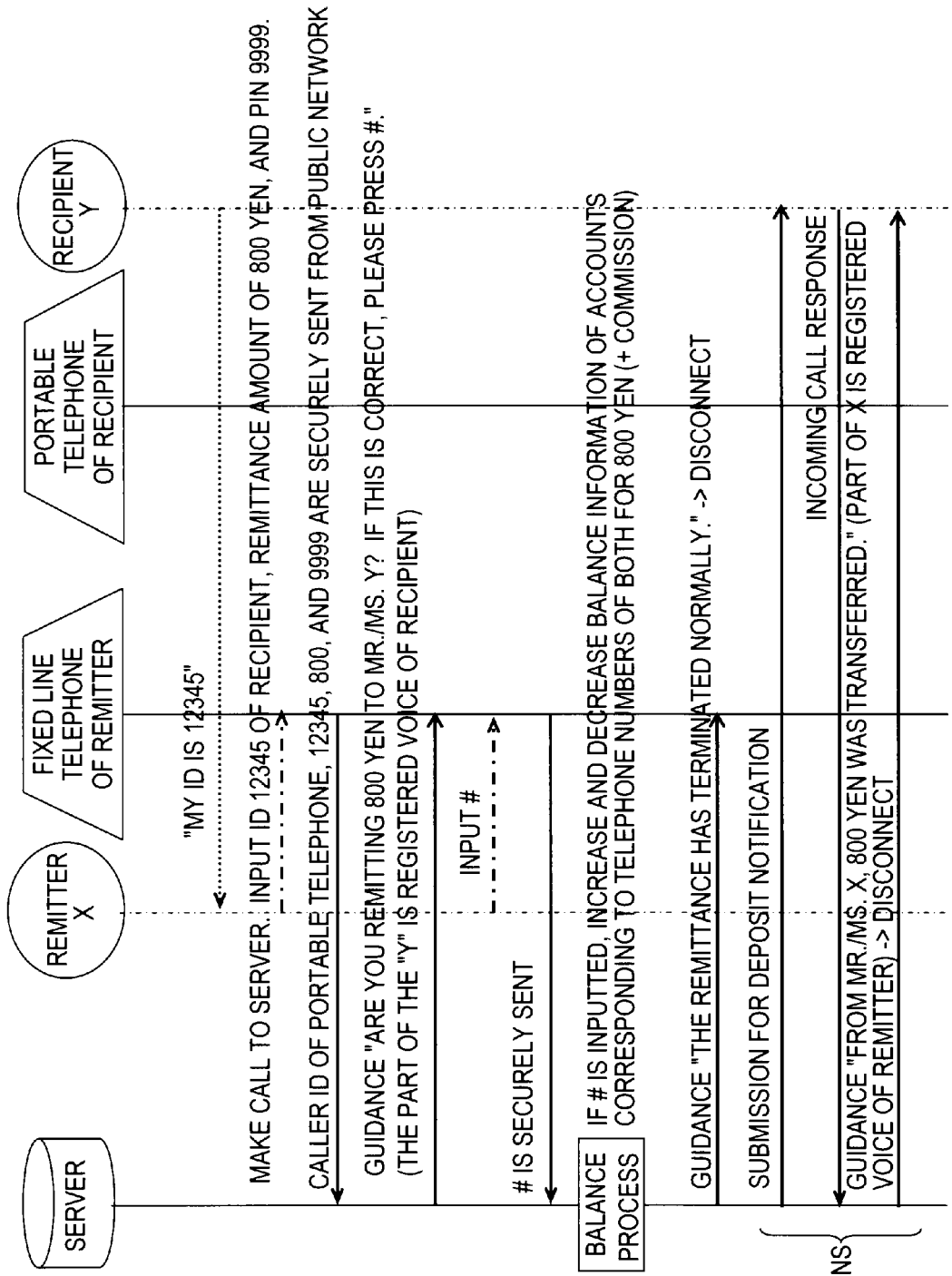
FIG. 8 is a sequence chart showing one example of a forward remittance process in the first embodiment.

As shown in FIG. 8, when a submission is made from the server 3 to the portable telephone 2 of the recipient Y and the recipient Y responses, voice guidance representing the remittance details described above, for example, "From Mr./Ms. X, 800 yen was transferred." (it should be noted that the part of "X" is predetermined voice information of the remitter X) may also be sent out to the portable telephone 2.

In steps s41 through s44 of authenticating the remitter, a voice input of not only the personal identification number but also the keyword may be requested and verification of the keyword or the voiceprint registered in the database 33 may also be carried out in conjunction. Furthermore, similar to the event of a reverse remittance process, instead of the balance information, the database 33 may also store information regarding an account of a financial institution therein, and when the particular key input is received, the financial institution may be requested to withdraw and transfer an amount according to a remittance amount to the account corresponding to the unique ID of the remitter user and the unique ID of the recipient user.

In addition, for a recipient once confirmed with the validity by carrying out a forward remittance process, from the next time, by making a call to a server, by selecting a recipient from an address book or the like of a portable telephone, and by sending with a three digit prefix number, such as "111", at the top, remittance may also be carried out immediately without an input of the personal identification number, confirmation of the recipient voice, and the like. At this occasion, a remittance amount can also be specifiable at the same time by sending it using a subaddress as, for example, "111-090-1111-1111*800" or the like.

Furthermore, a message recording function to a recipient may also be equipped and remittance may also be activated after confirming the other party by a call with a recipient.

[Deposit Process]

In the event of selecting a "deposit process" in the selection menu of the initial process, it is possible to increase the amount of the balance information registered in the database 33 in association with the telephone number of a user.

That is, after going through steps of authenticating a user similar to the event of the forward remittance process described above (It should be noted that an input of the telephone number of a recipient is not allowed. Inclusion of keyword and voiceprint verification is allowed.), by inputting an amount intended to increase, the balance information registered in the database 33 in association with the telephone number of the user can be increased in amount. The increased amount is billed to a user by, for example, being added to a telephone bill for the next month.

[Withdrawal Process]

In the event of selecting a "withdrawal process" in the selection menu of the initial process, it is possible to select a withdrawal pattern at the time of a withdrawal (remittance).

That is, after going through steps of authenticating a user similar to the event of the forward remittance process described above (It should be noted that an input of the telephone number of a recipient is not allowed. Inclusion of keyword and voiceprint verification is allowed.), in a menu selection format of voice guidance as s6 and s7 of the initial process described above, it is possible to select a withdrawal from the balance information registered in the database 33 or a withdrawal from the account of a financial institution registered in the database 33. By inputting a particular key (for example, "#") during the voice guidance, a withdrawal account may also be allowed to be registered.

[Balance Inquiry Process]

In the event of selecting a "balance inquiry process" in the selection menu of the initial process, it is possible to carry out an inquiry of the balance information registered in association with the telephone number of the user in the database 33.

That is, after going through steps of authenticating a user similar to the event of the forward remittance process described above (It should be noted that an input of the telephone number of a recipient is not allowed. Inclusion of keyword and voiceprint verification is allowed.), it is possible to hear balance information in a voice via the voice response function 31.

[History Inquiry Process]

In the event of selecting a "history inquiry process" in the selection menu of the initial process, it is possible to carry out an inquiry of information of a deposit and withdrawal history registered in the database 33 in association with the telephone number of the user.

That is, after going through steps of authenticating a user similar to the event of the forward remittance process described above (It should be noted that an input of the telephone number of a recipient is not allowed. Inclusion of keyword and voiceprint verification is allowed.), it is possible to hear information of a deposit and withdrawal history in a voice via the voice response function 31. For example, a guidance voice, such as first transaction, 10th day of the month, at 10 minutes past 10 o'clock, a deposit of 800 yen, Mr. Taro Yamada, message "Money for the drinking session on yesterday", second transaction, 11th day of the month, at 11 minutes past 11 o'clock, a withdrawal of 5000 yen, Tokyo Electric Power Company, message "Electricity bill for August", is presented.

Second Embodiment

Figure 9:
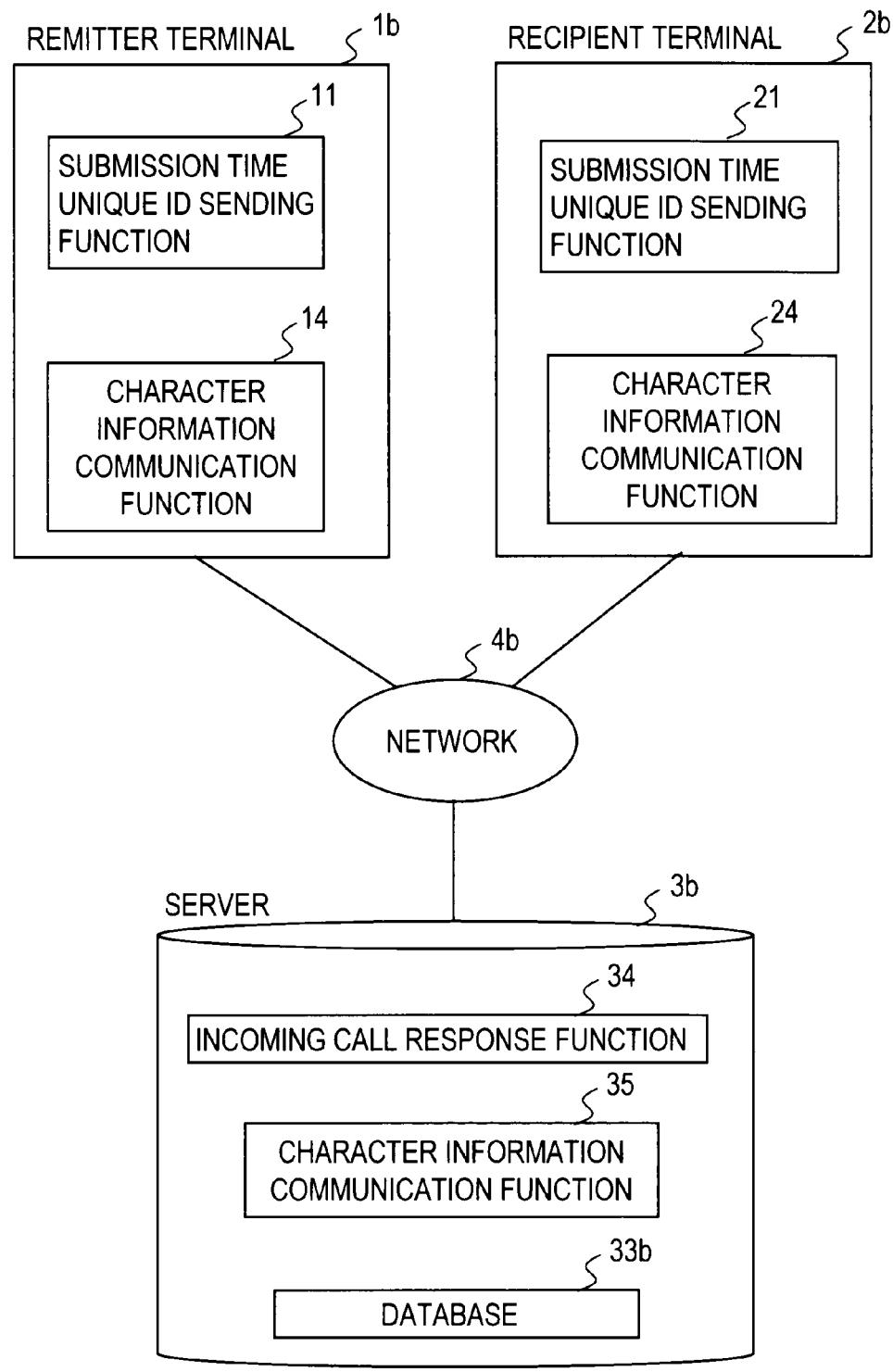
FIG. 9 is a block diagram showing a second embodiment of an electronic settlement system of the present invention.

FIG. 9 shows a second embodiment of an electronic settlement system of the present invention, which is, here, an example corresponding to the event of using a user terminal provided with a character information communication function instead of the voice calling function, and in the drawing, a component identical to the first embodiment is represented by an identical reference symbol. 1*b* is a remitter terminal, 2*b* is a recipient terminal, 3*b* is a server, and 4*b* is a network.

The remitter terminal 1*b* and the recipient terminal 2*b* are made with a communication device, for example, a known personal computer or a portable telephone equipped with a browser (hereinafter, a browser telephone), respectively provided at least with submission time unique ID sending functions 11 and 21 and character information communication functions 14 and 24.

The character information communication functions 14 and 24 send character information (including not only text data but also display control information to characters and the like) including numbers, alphabets, various symbols, Chinese characters converted by a known FEP or the like based on them, and the like to a connection destination in response to a user operation to an input device, such as a keyboard, and receive the character information from the connection destination to display it on a display device.

The server 3*b* is made with a known computer device connectable to a network, provided at least with a database 33*b*, an incoming call response function 34, and a character information communication function 35.

The incoming call response function 34 carries out detection of a connection from a user terminal. The character information communication function 35 sends character information to a user terminal and receives character information from a user terminal. The database 33*b* is similar to the event of the first embodiment except that voice information and a voiceprint are not registered.

The network 4*b* is made with a communication network that can transmit a character information between a user terminal and a server, for example, a public telephone network including a portable telephone network and the Internet (it should be noted that, in the event of the Internet, in order to secure the security, communication is carried out via a VPN by an IPsec or an SSL).

Figure 10:
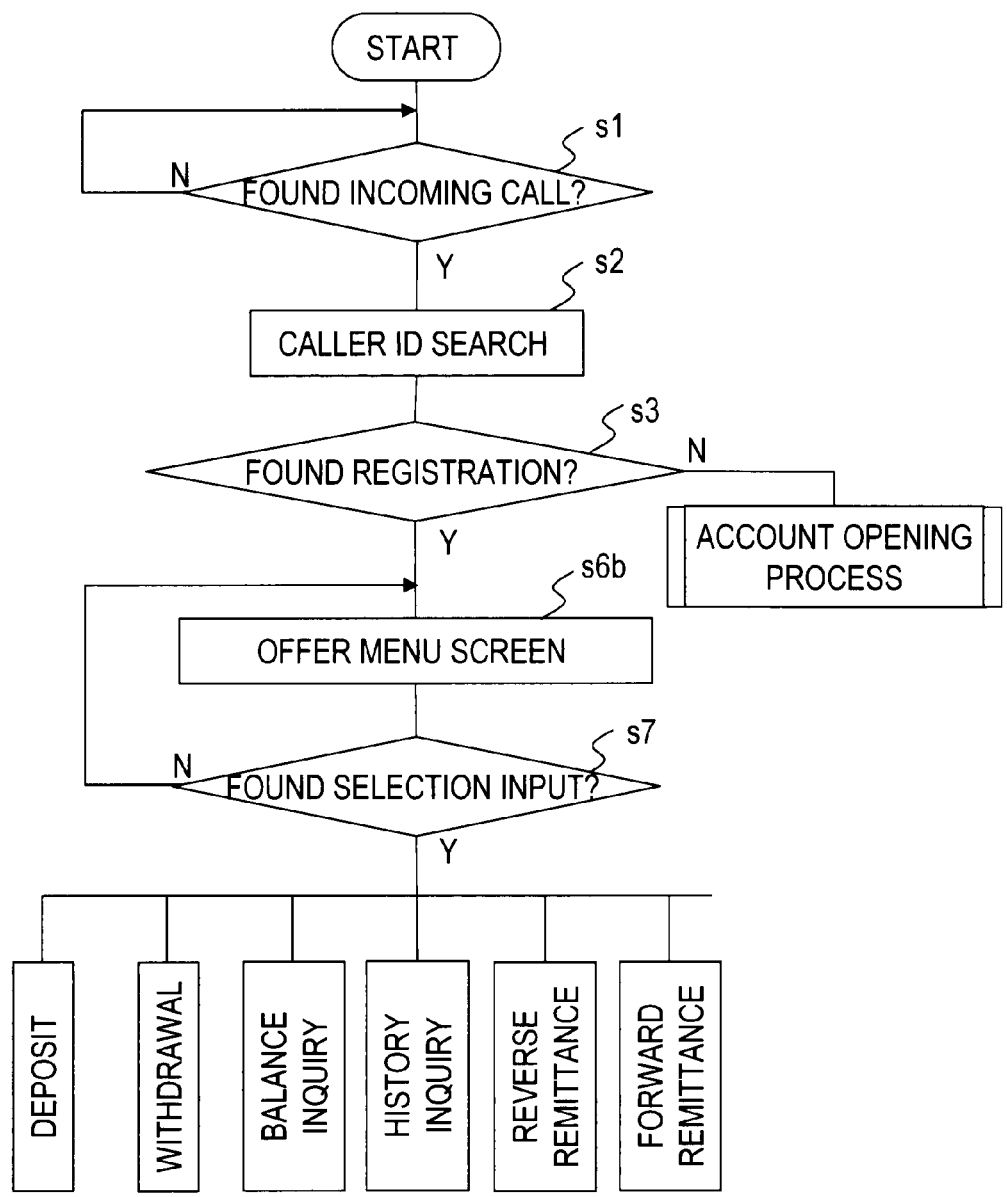
FIG. 10 is a flowchart of an initial process in a server of the second embodiment.
Figure 11:
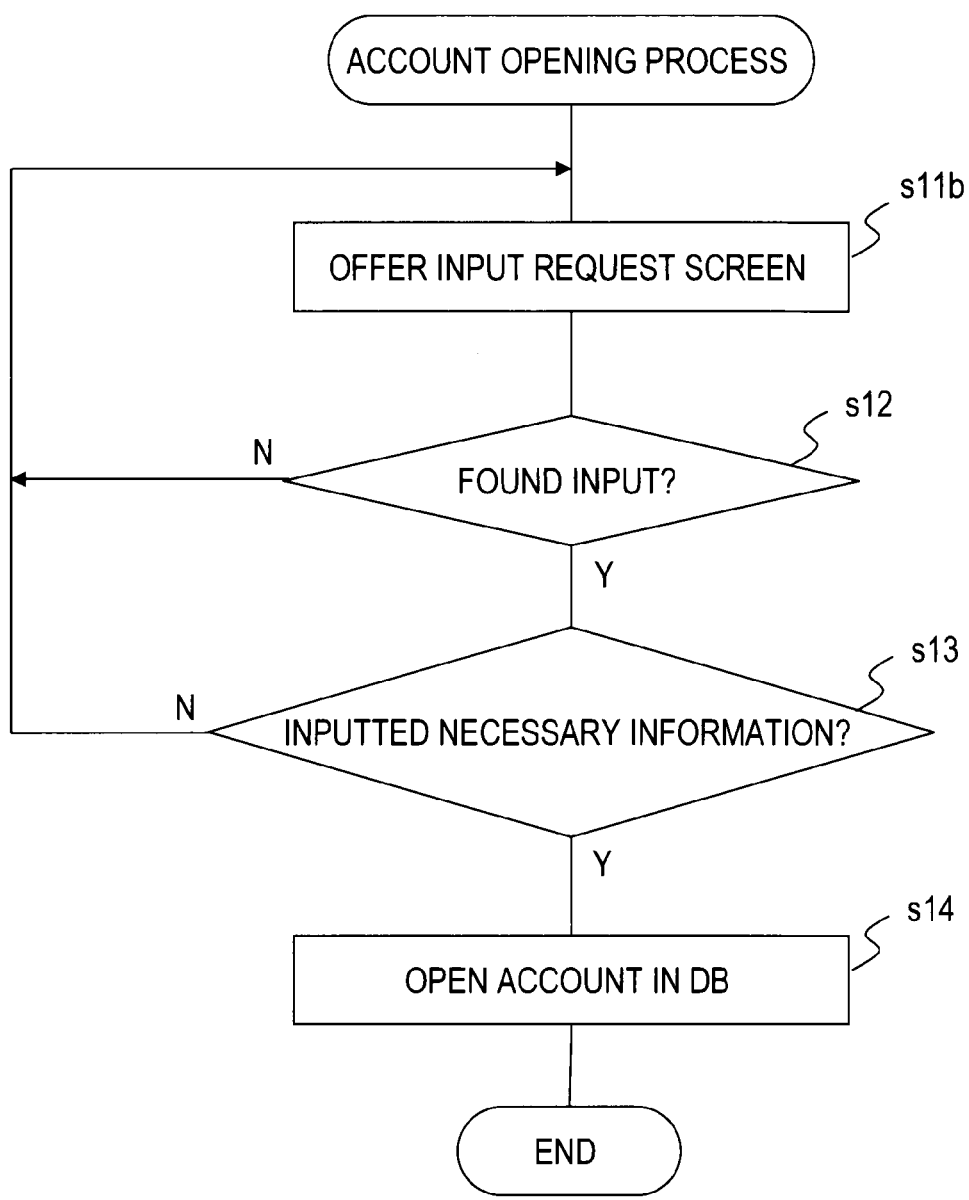
FIG. 11 is a flowchart of an account opening process in a server of the second embodiment.
Figure 12:
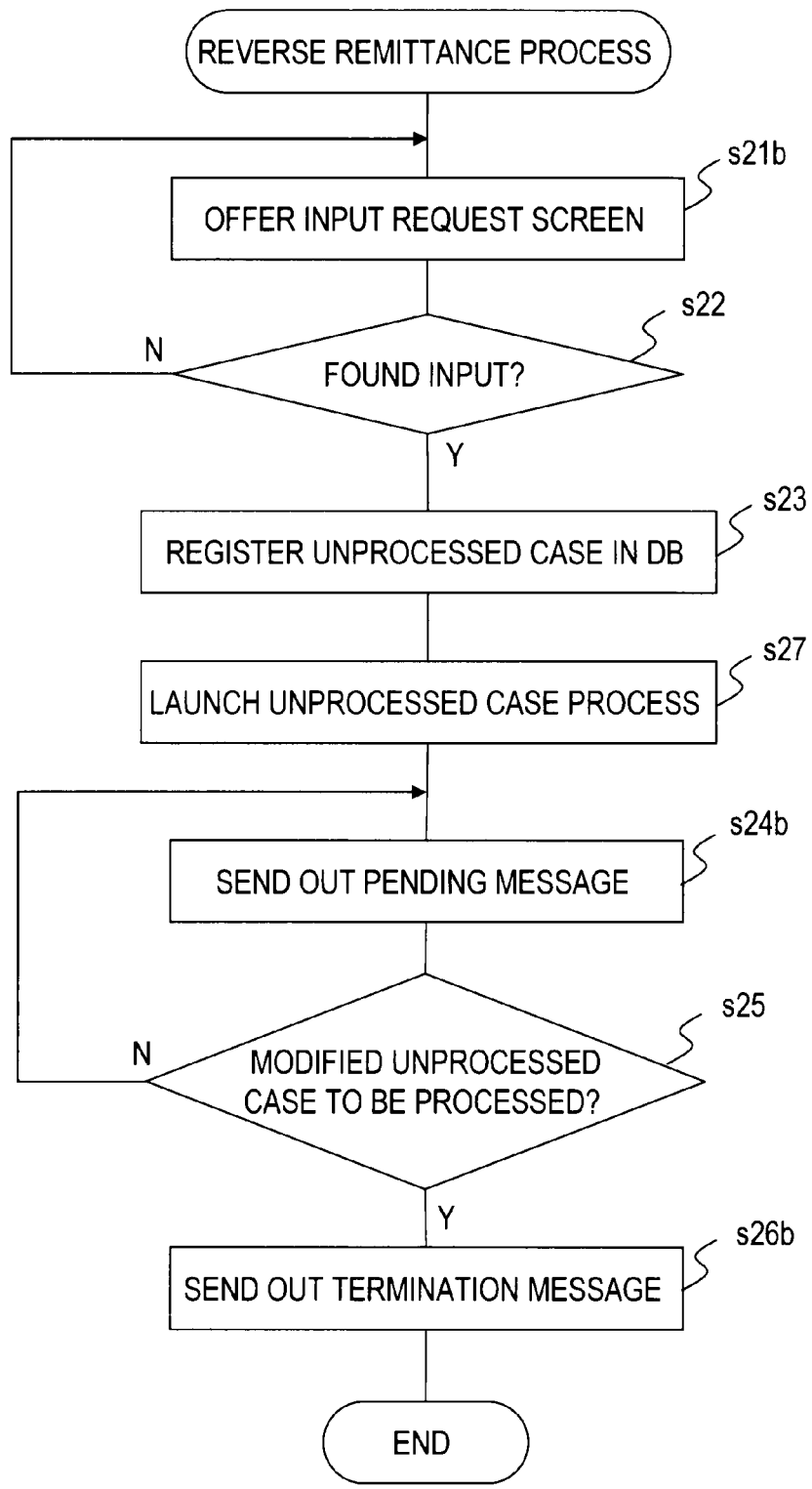
FIG. 12 is a flowchart of a reverse remittance process in a server of the second embodiment.
Figure 13:
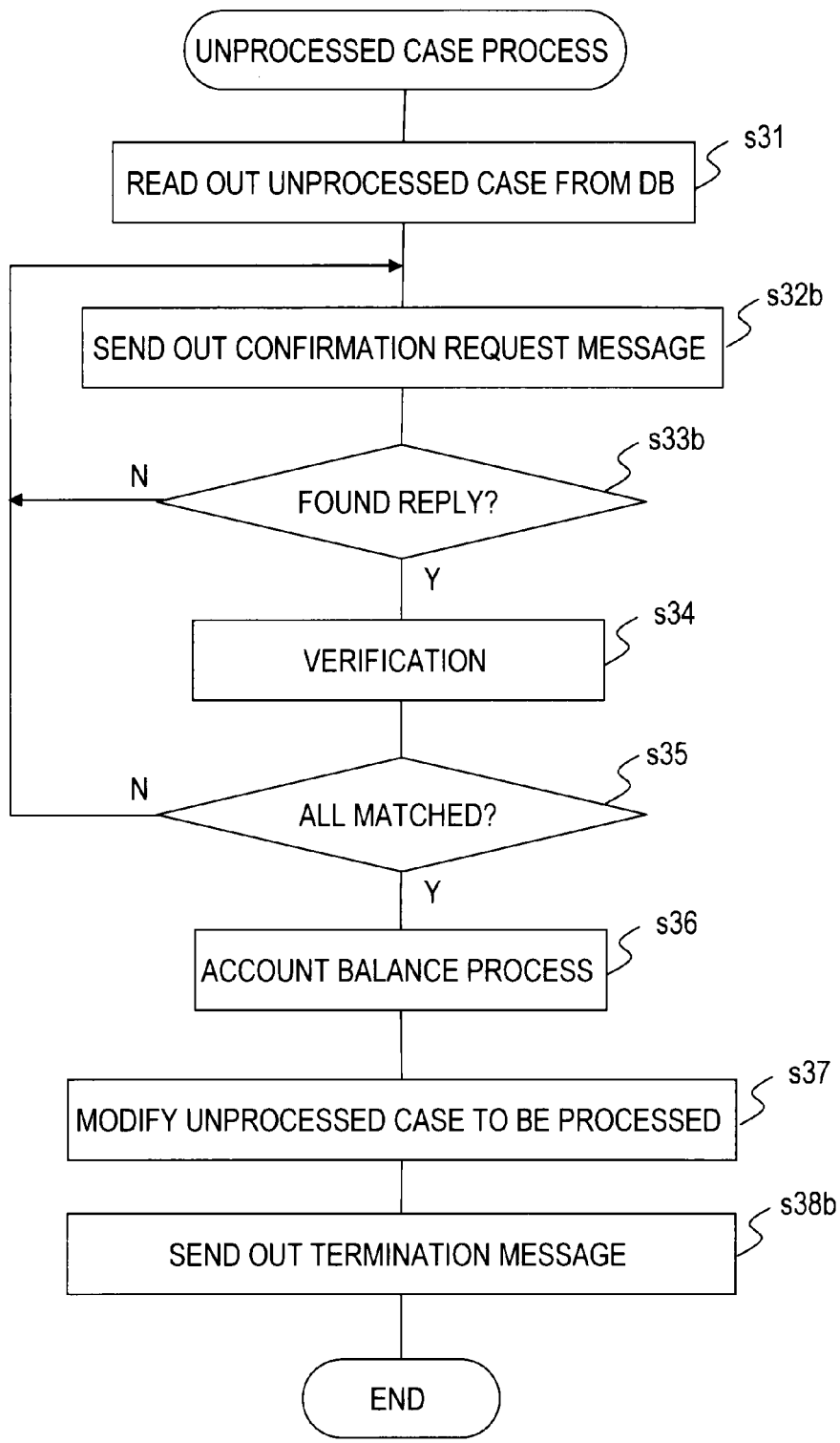
FIG. 13 is a flowchart of an unprocessed case (billing case) process in a server of the second embodiment.
Figure 14:
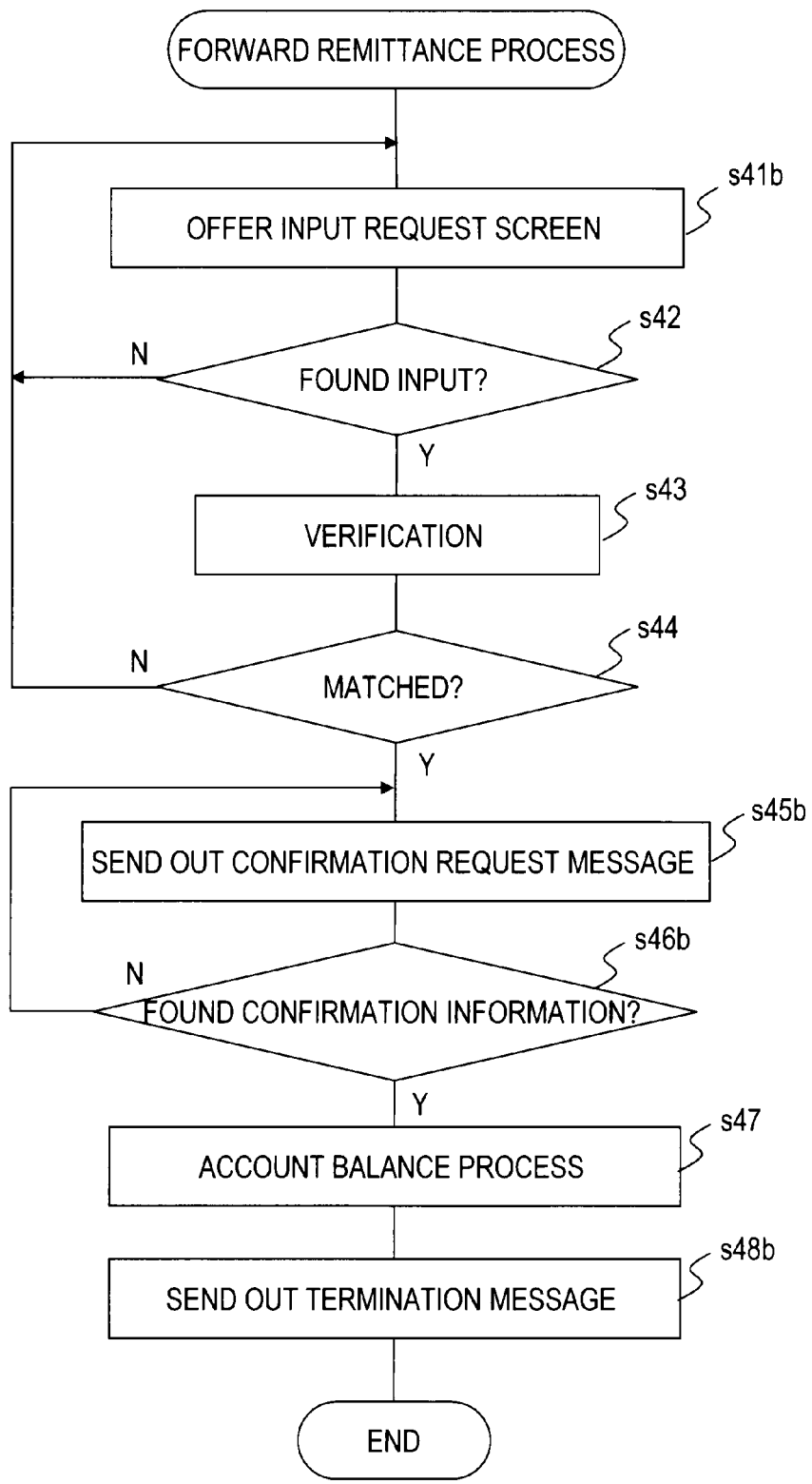
FIG. 14 is a flowchart of a forward remittance process in a server of the second embodiment.

FIGS. 10 through 14 show flows of various processes in the server 3*b*, that is, FIG. 10 shows a flow of an initial process, FIG. 11 shows a flow of an account opening process, FIG. 12 shows a flow of a reverse remittance process, FIG. 13 shows a flow of an unprocessed case (billing case) process, and FIG. 14 shows a flow of a forward remittance process, and the server 3*b* is configured with respective means achieved by cooperation with a program, a CPU, a memory, and the like corresponding to the flows of these processes, and the above described database 33*b*, incoming call response function 34, and character information communication function 35.

A description is given below to a method of settlement by the present system together with details of the server.

[Initial Process]

As shown in FIG. 10, when the server 3*b* detects an access (incoming call) from a user terminal via the incoming call response function 34 (s1), it investigates whether or not a caller ID included in the call request signal by the submission time unique ID sending function 11 or 21 of the user terminal is registered in the database 33*b* (s2), and if not registered (s3), it moves on to an account opening process as an incoming call from a terminal of a new user.

In contrast, if the caller ID is registered, the server 3*b* sends out a screen (menu screen) offering character information of processing items that can be selected using the character information communication function 35 in a menu format to a user terminal (s6*b*) to wait for a selection input by character information from a user terminal via the character information communication function 35 (s7).

Here, the menu screen is to represent processing items, such as "deposit", "withdrawal", "balance inquiry", "history inquiry", "reverse remittance", and "forward remittance", as character information together with a respectively different number or symbol in association with the processing items in advance. The selection input is carried out by sending out a number or a symbol corresponding to the processing item intended to be selected as character information by the character information communication function 14 or 24 of the user terminal.

[Account Opening Process]

In the event of moving on from the initial process to the account opening process, as shown in FIG. 11, the server 3*b* sends out a screen including character information requesting an input of information necessary for an account opening using the character information communication function 35 to the user terminal (s11*b*) to wait for a character information input from a user terminal via the character information communication function 35 (s12). Here, the information necessary for an account opening is a name, a personal identification number, an arbitrary keyword, and the like out of the information registered in the database 33*b* in association with a caller ID of a user described above.

In the event that all necessary information is inputted from a user terminal (s13), the server 3*b* registers the inputted information in the database 33*b* in association with the caller ID of the user, thereby opening an account of the user (s14). At the beginning of opening an account, other information, for example, balance information and history information are naturally 0 or blank.

[Reverse Remittance Process and Unprocessed Case Process]

A case of selecting the "reverse remittance process" in a selection menu of the initial process is a case that a recipient requests monetary settlement, such as a payment of an expense associated with a product purchase, to a remitter through the present system, and in this event, an "unprocessed case process" to the remitter occurs at the same time.

Figure 15:
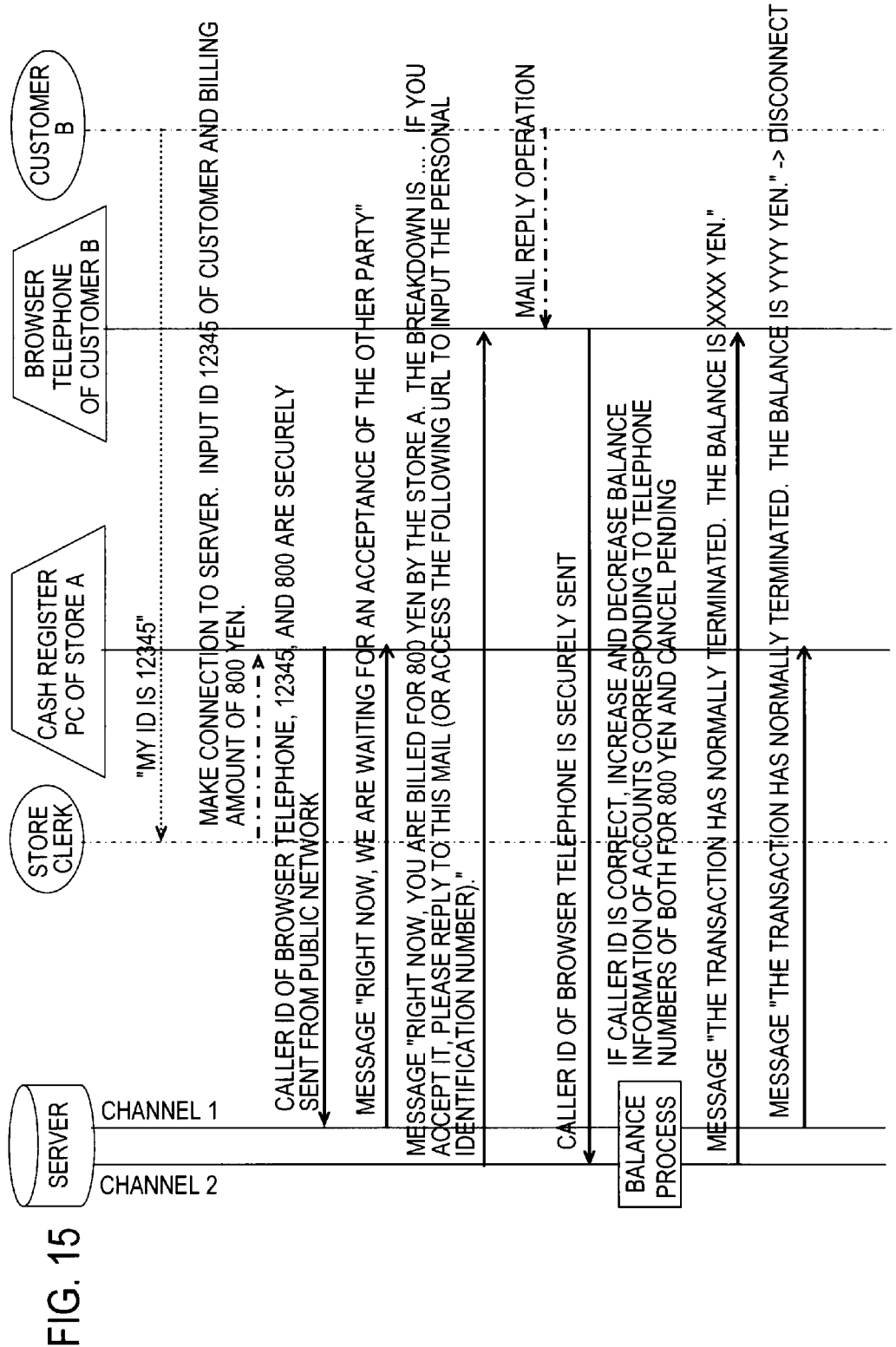
FIG. 15 is a sequence chart showing one example of a reverse remittance process and an unprocessed case process in the second embodiment.

A description is given below to a behavior in the event that the recipient is a store A that sells products and the recipient terminal $2b$ is a personal computer dedicated for a cash register (hereinafter, a cash register PC) of the store A, and the remitter is a customer B that purchases a product from the store A and the remitter terminal $1b$ thereof is a browser telephone, and further the network $4b$ is a public telephone network (including a portable telephone network) using a sequence chart of FIG. 15 together with flowcharts of FIGS. 12 and 13. In FIG. 15, an arrow in a solid line shows a flow of information between any terminal and the server, an arrow in a dash dotted line shows an operation to any terminal, and an arrow in a dotted line shows a direct conversation between the remitter and the recipient. Both the store (recipient) A and the customer (remitter) B are supposed to have completed the account opening process in advance.

At the time of a product purchase, the customer (remitter) B orally tells a telephone number (for example, "12345") of a browser telephone $1b$ of him/herself to a store clerk of the store (recipient) A. The store clerk of the store A that has heard the telephone number of the browser telephone $1b$ from the customer B makes a connection to the server $3b$ from a cash register PC $2b$ of the store A. At this occasion, the caller ID of the cash register PC $2b$ is securely sent via a public telephone network $4b$.

The server $3b$ that has received the submission from the cash register PC $2b$ carries out the initial process described above and sends out a menu screen to the cash register PC $2b$ after going through steps s1 through s3 (s$6b$), and the store clerk of the store A selectively inputs a "reverse remittance process" from the cash register PC $2b$ (s7).

When the "reverse remittance process" is selected, the server $3b$ sends out a screen including character information requesting an input of a telephone number and a billing amount of the remitter to the cash register PC $2b$ using the character information communication function 35 (s$21b$) to wait for a character information input from the cash register PC $2b$ (s22).

When the store clerk of the store A inputs the telephone number (here, "12345") of the browser telephone $1b$ of the customer B, the billing amount (for example, 800 yen), and in addition to them, transaction details, such as a product name of a purchased product, by the character information communication function 24 of the cash register PC $2b$, the server $3b$ receives the information via the character information communication function 35. At this occasion, the telephone number of the browser telephone $1b$ of the customer B, the billing amount, and the transaction details are securely sent via the public telephone network $4b$.

The telephone number of the browser telephone $1b$ may also be directly inputted by the customer B, instead of being told orally from the customer B to be inputted to the cash register PC $2b$ by the store clerk of the store A.

The server $3b$ registers unprocessed ones out of information regarding withdrawals, in which the origin of billing is the user of the cash register PC $2b$ having selected the reverse remittance process, that is, the store A and the withdrawal amount is the received billing amount, that is, unprocessed case information, in the database $33b$ in association with the received telephone number of the browser telephone $1b$ (s23) and launches the unprocessed case process (s27) and also sends out a message indicating that it is in a state of waiting for an acceptance of the remitter (in a pending state), for example, "Right now, we are waiting for an acceptance of the other party." to the cash register PC $2b$ (s$24b$).

When the unprocessed case process is launched, the server $3b$ reads out the unprocessed case information from the database $33b$ (s31) and sends out a short message including a message, which requests to return confirmation information indicating an intention to accept the remittance to the reverse remittance request and includes at least information regarding the recipient user and information regarding the transaction amount registered in the database $33b$ corresponding to the telephone number of the cash register PC $2b$ having carried out a request corresponding to the unprocessed case information, to the browser telephone $1b$ (s$32b$) using the character information communication function 35 to wait for a reply (s$33b$).

Here, the information regarding the recipient user is a name (designation) of the origin of billing. The confirmation information indicating an intention to accept the remittance is generally a personal identification number and a keyword out of information registered in association with the telephone number of the browser telephone $1b$ in the database $33b$ while, here, it is also allowed to be substituted with (a caller ID of) a reply mail to the short message. Alternatively, a URL may also be separately specified to seek an access to the site and an input of the personal identification number and the keyword.

Accordingly, contents of the message are, for example, "Right now, you are billed for 800 yen by the store A. The breakdown is . . . . If you accept it, please reply to this mail (or access the following URL to input the personal identification number)." (the part of "the breakdown is . . . " is the transaction details).

When the customer B sends out the reply mail by the character information communication function 14 of the browser telephone $1b$, the server $3b$ receives it via the incoming call response function 34. At this occasion, the caller ID of the customer B is securely sent via the public telephone network $4b$.

The server $3b$ verifies the caller ID of the mail replied from the browser telephone $1b$ with the telephone number of the destination of the short message described above (s34).

In the event that result of the verification indicate match (s35), the server $3b$ updates the balance information in the database $33b$ corresponding to the telephone number of the browser telephone $1b$ and the telephone number of the cash register PC $2b$ in accordance with the billing amount, that is, reduces the amount of the balance information in the database $33b$ corresponding to the telephone number of the browser telephone $1b$ and increases the amount of the balance information in the database $33b$ corresponding to the telephone number of the cash register PC $2b$ (s36).

After that, the server $3b$ deletes the registration of the unprocessed case information registered in the database $33b$ corresponding to the telephone number of the browser telephone $1b$, to be accurate, modifies the unprocessed one out of information regarding withdrawals registered in the database $33b$ corresponding to the telephone number of the browser telephone $1b$ to be a processed one (s37) and also sends out a message notifying of termination of the transaction, for example, a short message including "The transaction has normally terminated. The balance is xxxx yen." using the character information communication function 35 to the browser telephone $1b$ (s$38b$).

Based on the deletion of the registration of the unprocessed case information registered in the database 33b corresponding to the telephone number of the browser telephone 1b, to be accurate, the modification of the unprocessed case information to be a processed one (s25), the server 3b sends out a message notifying of termination of the transaction (completion of the request), for example, "The transaction has normally terminated. The balance is yyyy yen." to the cash register PC 2b using the character information communication function 35 (s26b) to disconnect the line.

Similar to the event of the first embodiment, it may be also possible to temporarily store the information regarding unprocessed withdrawals in a storage device separate from the database 33b in association with the unique ID of the user, and after processing, copy as information regarding a processed withdrawal (history information) in the database 33b and also delete it from the separate storage device.

Instead of the balance information, the database 33b may also store information regarding an account of a financial institution therein, and when results of all verification indicate match, the financial institution may be requested to withdraw and transfer an amount according to a billing amount to the account corresponding to the unique ID of the remitter user and the unique ID of the recipient user.

Furthermore, in the event of requesting to a large number of parties for a short period of time, the contracts may also be cancelled.

[Forward Remittance Process]

The case of selecting "forward remittance" in the selection menu of the initial process is a case of carrying out simple remittance (transfer) from a remitter to a recipient through the present system.

A description is given below to a behavior in the event that a remitter terminal 1b of a remitter (individual person) X is a browser telephone and a recipient terminal 2b of a recipient (individual person) Y is also a browser telephone using a sequence chart of FIG. 16 together with a flowchart of FIG. 14.

At the time of remittance, the recipient Y orally tells a telephone number (for example, "12345") of a browser telephone 2b of him/herself to the remitter X. The remitter X that has heard the telephone number of the browser telephone 2b from the recipient Y makes a call (submission) to the server 3b from a browser telephone 1b thereof. At this occasion, the caller ID of the browser telephone 1b is securely sent via the public telephone network 4b.

The server 3b that has received the submission from the browser telephone 1b carries out the initial process described above and sends out a menu screen to the browser telephone 1b after going through steps s1 through s3 (s6b), and the remitter X selectively inputs "forward remittance process" from the browser telephone 1b (s7).

When the "forward remittance process" is selected, the server 3b sends out a screen including character information requesting an input of the telephone number of the recipient, a remittance amount, and a personal identification number of the remitter X to the browser telephone 1b using the character information communication function 35 (s41b) to wait for a character information input from the browser telephone 1b (s42).

When the remitter X inputs the telephone number (here, "12345") of the browser telephone 2b of the recipient Y, the remittance amount (for example, 800 yen), and the personal identification number of him/herself by the character information communication function 14 of the browser telephone 1b, the server 3b receives the information via the character information communication function 35. At this occasion, the telephone number of the browser telephone 2b of the recipient Y, the remittance amount, and the personal identification number are securely sent via the public telephone network 4b. At this occasion, arbitrary message to tell the recipient Y may also be inputted together.

The server 3b verifies the personal identification number inputted from the browser telephone 1b with the personal identification number registered in the database 33b corresponding to the telephone number of the browser telephone 1b (s43).

In the event that result of the verification indicates match (s44), the server 3b sends out a return request, which relates to confirmation information indicating an intention to accept remittance to the forward remittance request and includes at least information regarding the recipient user and information regarding the transaction amount registered in the database 33b corresponding to the telephone number of the browser telephone 2b of the recipient Y having carried out the forward remittance request using the character information communication function 35, to the browser telephone 1b (s45b) to wait for an input from the browser telephone 1b via the character information communication function 35 (s46b). In the event that result of the verification doesn't indicate match, a reentry may also be sought at certain times.

Here, the information regarding the recipient user is a name (designation) of the origin of remittance. Although the confirmation information indicating an intention to accept the remittance is generally a personal identification number and a keyword out of information registered in association with the telephone number of the browser telephone 1b in the database 33b, here it is character information corresponding to at least a part of a name of the recipient user registered in the database 33b in advance corresponding to the unique ID of the recipient user.

Accordingly, contents of the message are, for example, "Are you remitting 800 yen to Mr./Ms. Y? If this is correct, please input the name of the recipient."

When the remitter X inputs character information corresponding to the name of the recipient by the character information communication function 14 of the browser telephone 1b, the server 3b receives the character information via the character information communication function 35. At this occasion, the character information is securely sent via the public telephone network 4b.

After that, if the inputted character information matches with the character information of the name of the recipient user registered in the database 33b in advance corresponding to the unique ID of the recipient user, the server 3b updates the balance information in the database 33b corresponding to the telephone number of the browser telephone 1b and the telephone number of the browser telephone 2b in accordance with the remittance amount, that is, reduces the amount of the balance information in the database 33b corresponding to the telephone number of the browser telephone 1b and increases the amount of the balance information in the database 33b corresponding to the telephone number of the browser telephone 2b (s47), and sends out a message notifying of completion of remittance, for example, "The remittance has completed normally." using the character information communication function 35 to the browser telephone 1b (s48b) to disconnect the line.

Figure 16:
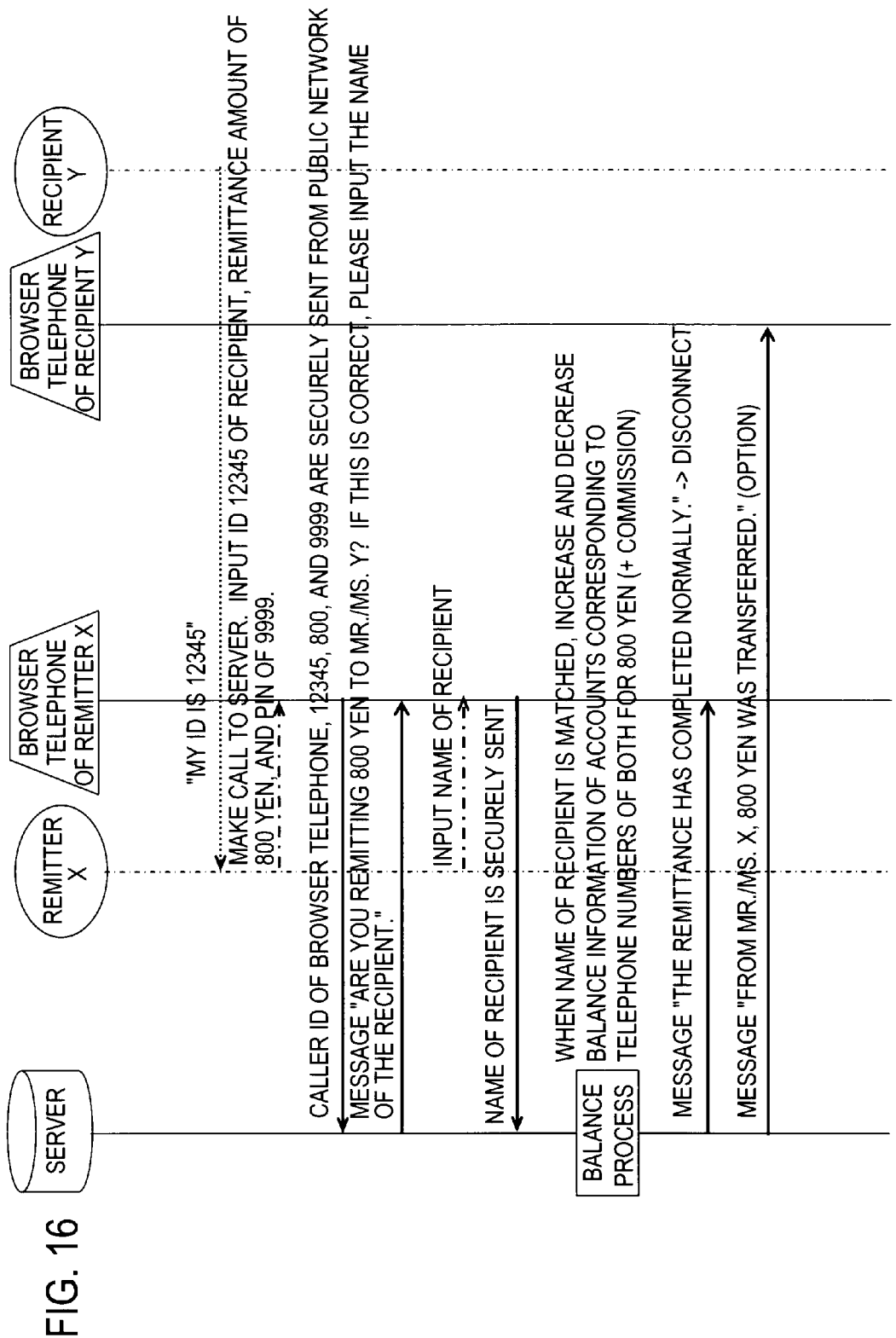
FIG. 16 is a sequence chart showing one example of a forward remittance process in the second embodiment.

As shown in FIG. 16, a message notifying of completion of the remittance according to the forward remittance request, for example, a short message including "From Mr./Ms. X, 800 yen was transferred." may also be sent out from the server 3b to the browser telephone 2b of the recipient Y. At this occasion, the above described arbitrary message inputted by the remitter may also be included.

In steps s41b through s44 of authenticating the remitter, an input of not only the personal identification number but also the keyword may be requested and verification of the keyword registered in the database 33b may also be carried out in conjunction. Furthermore, similar to the event of a reverse remittance process, instead of the balance information, the database 33b may also store information regarding an account of a financial institution therein, and when the name of the recipient is received, the financial institution may be requested to withdraw and transfer an amount according to a remittance amount to the account corresponding to the unique ID of the remitter user and the unique ID of the recipient user.

In addition, for a recipient once confirmed with the validity by carrying out a forward remittance process, from the next time, by making a call to a server, by selecting a recipient from an address book or the like of a browser telephone, and by sending with a three digit prefix number, such as "111", at the top, remittance may also be carried out immediately without an input of the personal identification number, an input of the recipient name, and the like. At this occasion, a remittance amount can also be specifiable at the same time by sending it using a subaddress as, for example, "111-090-1111-1111*800" or the like.

Regarding [deposit process], [withdrawal process], [balance inquiry process], [history inquiry process], and the like, the descriptions are omitted because they are similar to the event of the first embodiment except that the voice information is replaced with character information or a screen including character information.

Third Embodiment

Figure 17:
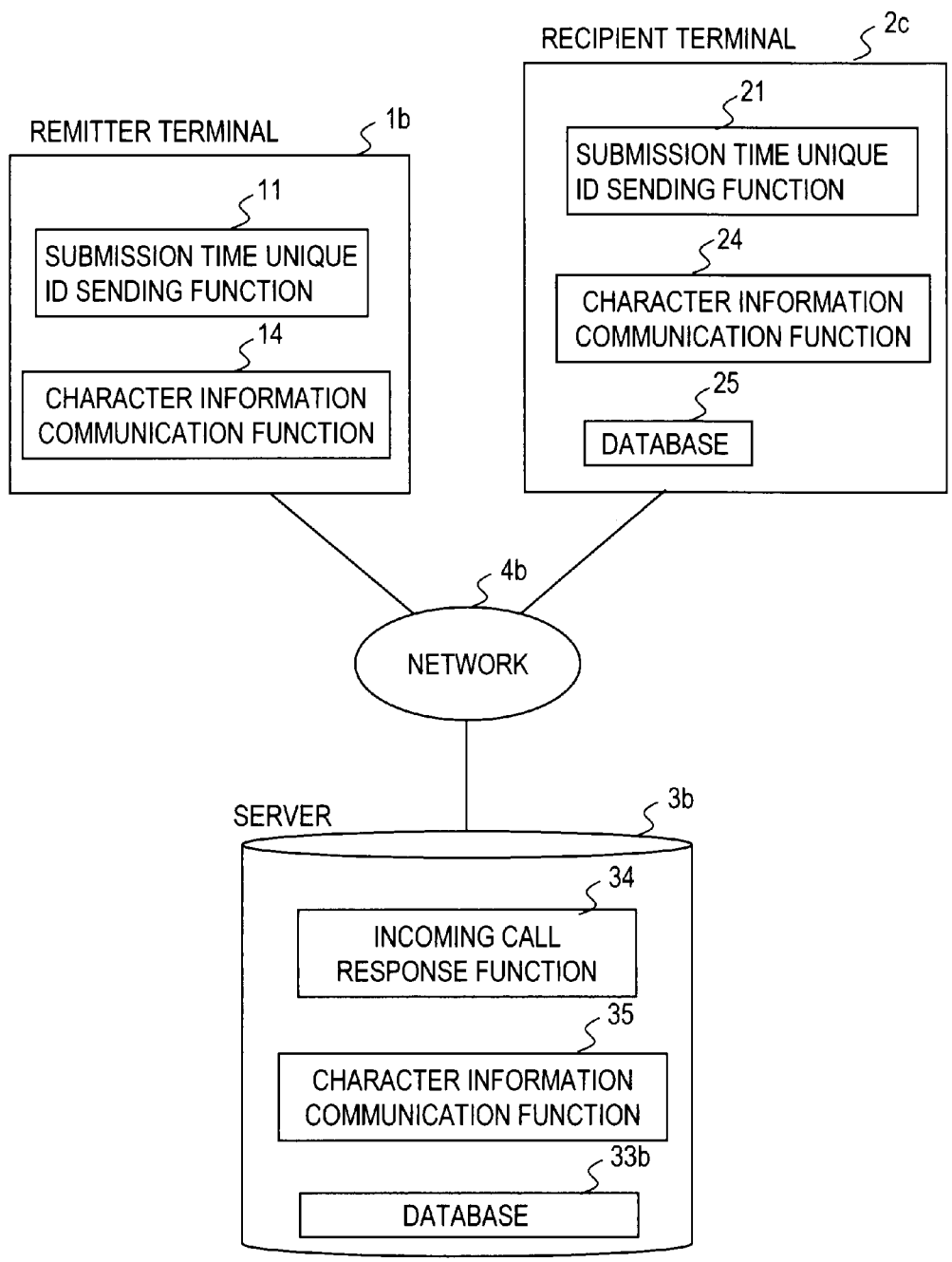
FIG. 17 is a block diagram showing a third embodiment of an electronic settlement system of the present invention.

FIG. 17 shows a third embodiment of an electronic settlement system of the present invention, which is, here, an example in which the recipient terminal in the second embodiment is a server operating a site that sells products through the Internet, a host computer of a company that provides a predetermined service (for example, public services, such as electricity and gas supply) to a user to bill a compensation therefor, or the like and that is provided with a function of receiving a request of monetary settlement (payment) from a remitter terminal via a network and automatically sending it to a server as a reverse remittance request, and in the drawing, a component identical to the first embodiment is represented by an identical reference symbol. 1b is a remitter terminal, 2c is a recipient terminal, 3b is a server, and 4b is a network.

The recipient terminal 2c is made with a communication device, for example, a known server or host computer provided at least with a submission time unique ID sending function 21, a character information communication function 24, and a database 25.

The database 25 stores billing items, such as a product name and a billing amount, for example, generated in association with a product purchase or service utilization by a user (remitter) therein in association with a unique ID of a user used by the user, here, a telephone number (caller ID).

Figure 18:
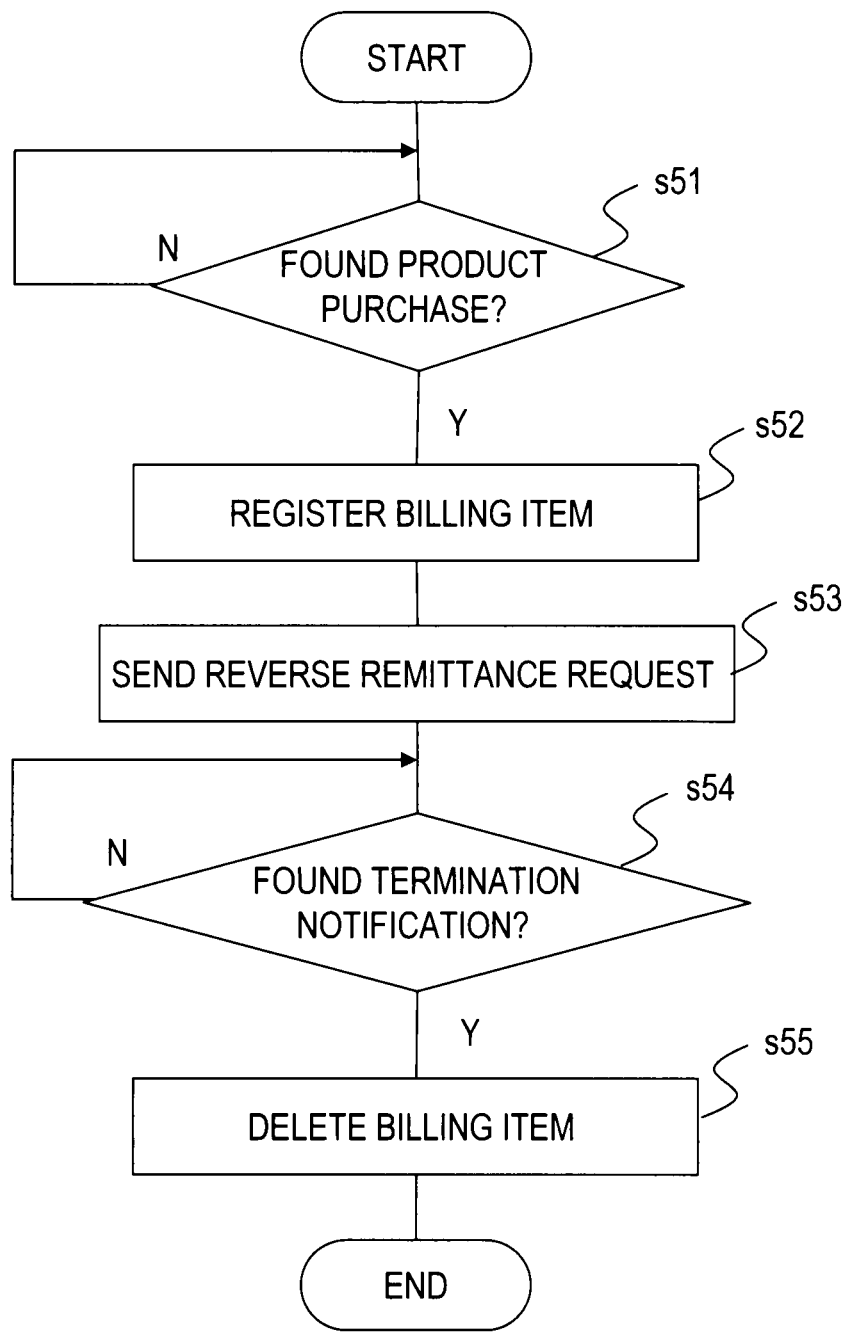
FIG. 18 is a flowchart of a billing process in a recipient terminal of the third embodiment.

FIG. 18 shows a flow of a billing process in the recipient terminal 2c, and the recipient terminal 2c is configured with respective means achieved by cooperation with a program, a CPU, a memory, and the like corresponding to the flow of the process, and the above described submission time unique ID sending function 21, character information communication function 24, and database 25.

[Reverse Remittance Process and Unprocessed Case Process]

Figure 19:
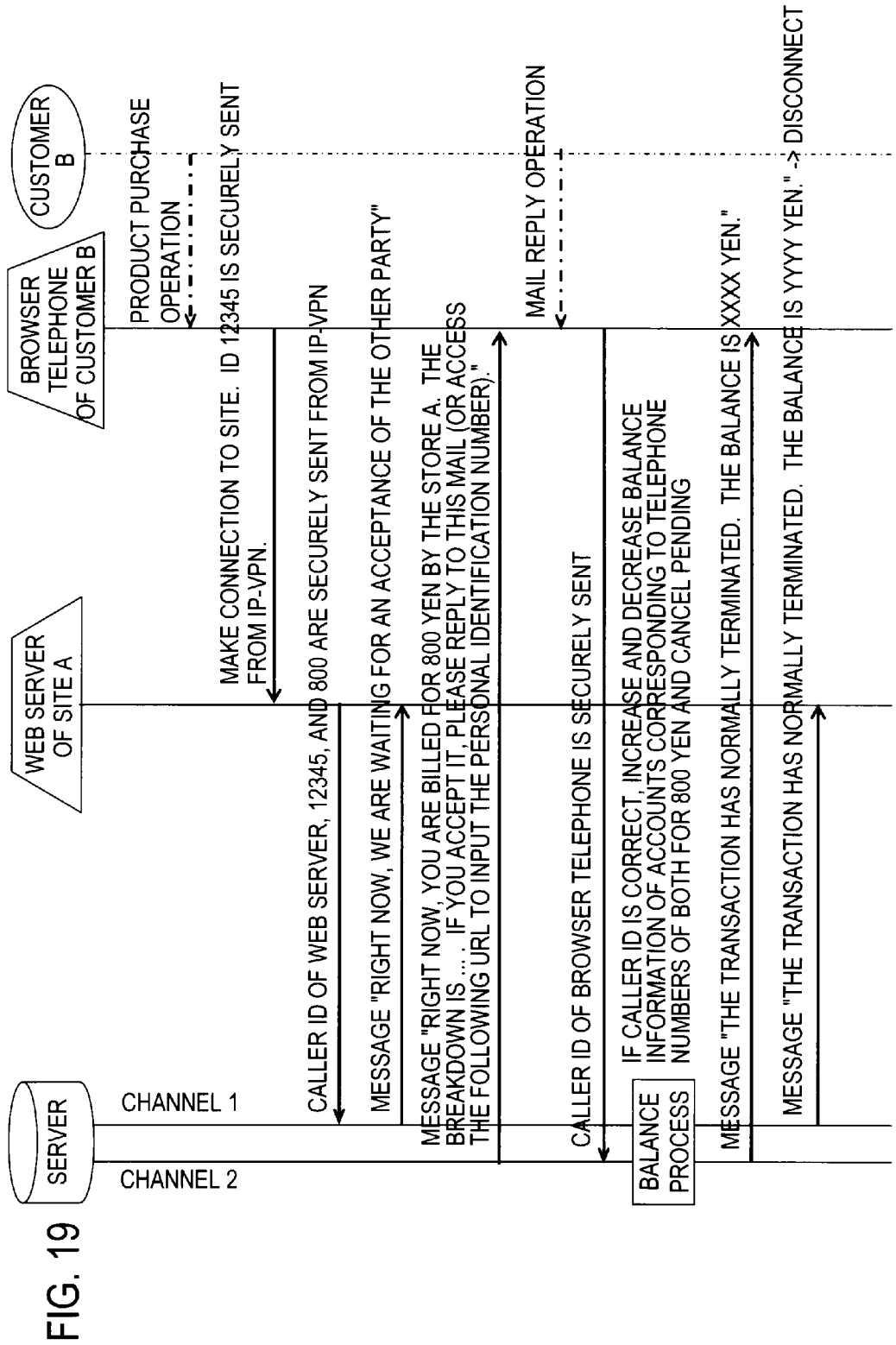
FIG. 19 is a sequence chart showing one example of a reverse remittance process and an unprocessed case process in the third embodiment.

A description is given below to a behavior in a reverse remittance process and an unprocessed case process in the event that the recipient is a site A that sells products through the Internet and the recipient terminal 2c is a web server of the site A, and the remitter is a customer B that purchases a product from the site A and the remitter terminal 1b thereof is a browser telephone, and further the network 4b is the Internet (IP-VPN) using a sequence chart of FIG. 19 together with flowcharts of FIGS. 12, 13, and 18. In FIG. 19, an arrow in a solid line shows a flow of information between any terminal and the server, and an arrow in a dash dotted line shows an operation to any terminal. Both the site (recipient) A and the customer (remitter) B are supposed to have completed the account opening process in advance.

When the customer (remitter) B accesses to the web server 2c of the site A via the IP-VPN 4b by the browser telephone 1b to carry out a product purchase (s51), the web server 2c registers a product name and a billing amount thereof in the database 25 in association with the telephone number of the browser telephone 1b as billing items associated with the product purchase (s52).

Then, the web server 2c accesses to the server 3b to send a reverse remittance request including the telephone number of the browser telephone 1b of the customer B and the billing amount (s53). At this occasion, the caller ID of the web server 2c, the telephone number of the browser telephone 1b of the customer B, and the billing amount are securely sent via the IP-VPN 4b.

The server 3b that has received the reverse remittance request from the web server 2c registers unprocessed ones out of information regarding withdrawals, in which the origin of billing is the user of the web server 2c having sent the reverse remittance process, that is, the site A and the withdrawal amount is the billing amount, that is, unprocessed case information, in the database 33b in association with the telephone number of the browser telephone 1b (s23) and launches the unprocessed case process (s27) and also sends out a message indicating that it is in a state of waiting for an acceptance of the remitter (in a pending state), for example, "Right now, we are waiting for an acceptance of the other party." to the web server 2c (s24b).

When the unprocessed case process is launched, the server 3b reads out the unprocessed case information from the database 33b (s31) and sends out a short message including a message, which requests to return confirmation information indicating an intention to accept the remittance to the reverse remittance request and includes at least information regarding the recipient user and the transaction amount registered in the database 33b corresponding to the telephone number of the web server 2c having carried out a request corresponding to the unprocessed case information, to the browser telephone 1b (s32b) using the character information communication function 35 to wait for a reply (s33b).

When the customer B sends out the reply mail by the character information communication function 14 of the browser telephone 1b, the server 3b receives it via the incoming call response function 34. At this occasion, the caller ID of the customer B is securely sent via the IP-VPN 4b.

The server 3b verifies the caller ID of the mail replied from the browser telephone 1b with the telephone number of the destination of the short message described above (s34).

In the event that result of the verification indicates match (s35), the server 3b updates the balance information in the database 33b corresponding to the telephone number of the browser telephone 1b and the telephone number of the web server 2c in accordance with the billing amount, that is, reduces the amount of the balance information in the database 33b corresponding to the telephone number of the browser telephone 1b and increases the amount of the balance information in the database 33b corresponding to the telephone number of the web server 2c (s36).

After that, the server 3b deletes the registration of the unprocessed case information registered in the database 33b corresponding to the telephone number of the browser telephone 1b, to be accurate, modifies the unprocessed one out of information regarding withdrawals registered in the database 33b corresponding to the telephone number of the browser telephone 1b to be a processed one (s37) and also sends out a message notifying of termination of the transaction, for example, a short message including "The transaction has normally terminated. The balance is xxxx yen." using the character information communication function 35 to the browser telephone 1b (s38b).

Based on the deletion of the registration of the unprocessed case information registered in the database 33b corresponding to the telephone number of the browser telephone 1b, to be accurate, the modification of the unprocessed case information to be a processed one (s25), the server 3b sends out a message notifying of termination of the transaction (completion of the request), for example, "The transaction has normally terminated. The balance is yyyy yen." to the web server 2c using the character information communication function 35 (s26b) to disconnect the line.

When the web server 2c receives the message notifying of termination of the transaction (completion of the request) (s54), it deletes relevant billing items from the database 25 (s55) for termination.

The notification to the browser telephone 1b of the termination of the transaction may also be carried out not from the server 3b but from the web server 2c.

In addition, by giving a recipient terminal a function of automatically sending a reverse remittance request to a server also in the first embodiment that carries out confirmation with voice information, it is possible to achieve a system in which the recipient is a site that sells products through the Internet or a company that provides a predetermined service to a user to bill a compensation therefor similar to the event of the third embodiment.

Other Embodiments

In the forward remittance process of the first through third embodiments, the notification to the recipient user terminal of completion of remittance may also be carried out in the event of detecting an access from the user terminal corresponding to the unique ID of the recipient user included in a forward remittance request after updating a balance.

In the forward remittance process of the first through third embodiments, after the step of receiving the forward remittance request and before the step of updating the balance, the server may also perform the steps of sending a return request, which relates to confirmation information indicating an intention to accept money reception to the forward remittance request and includes at least information regarding the remitter user and the transaction amount according to the forward remittance request to the recipient user terminal, and receiving confirmation information indicating an intention to accept the money reception to the forward remittance request from the recipient user terminal.

In the forward remittance process of the first through third embodiments, in the event of detecting an access from a user terminal corresponding to the unique ID of the recipient user included in the forward remittance request after receiving the forward remittance request and before updating the balance, the server may also perform the steps of sending at least information regarding the remitter user and the transaction amount according to the forward remittance request to the user terminal and receiving confirmation information indicating an intention to accept the money reception to the forward remittance request from the recipient user terminal.

Furthermore, the steps after the balance information update may also be performed, by using information similar to the confirmation information indicating an intention to accept remittance in the event of a reverse remittance process as the confirmation information indicating an intention to accept the money reception to the forward remittance request described above, after a verification process similar to the event of a reverse remittance process.

Fourth Embodiment

The first through third embodiments are embodiments of not implementing a special application to a user terminal. However, in the event that a smartphone (a portable telephone terminal that can run software applications) can be utilized as a user terminal, an application for an electronic settlement system of the present invention is installed in the smartphone to utilize it, thereby enabling to achieve a more convenient electronic settlement system. The smartphone in this context means a portable telephone terminal that can install and run a software application regardless of the carrier and the model.

Figure 20:
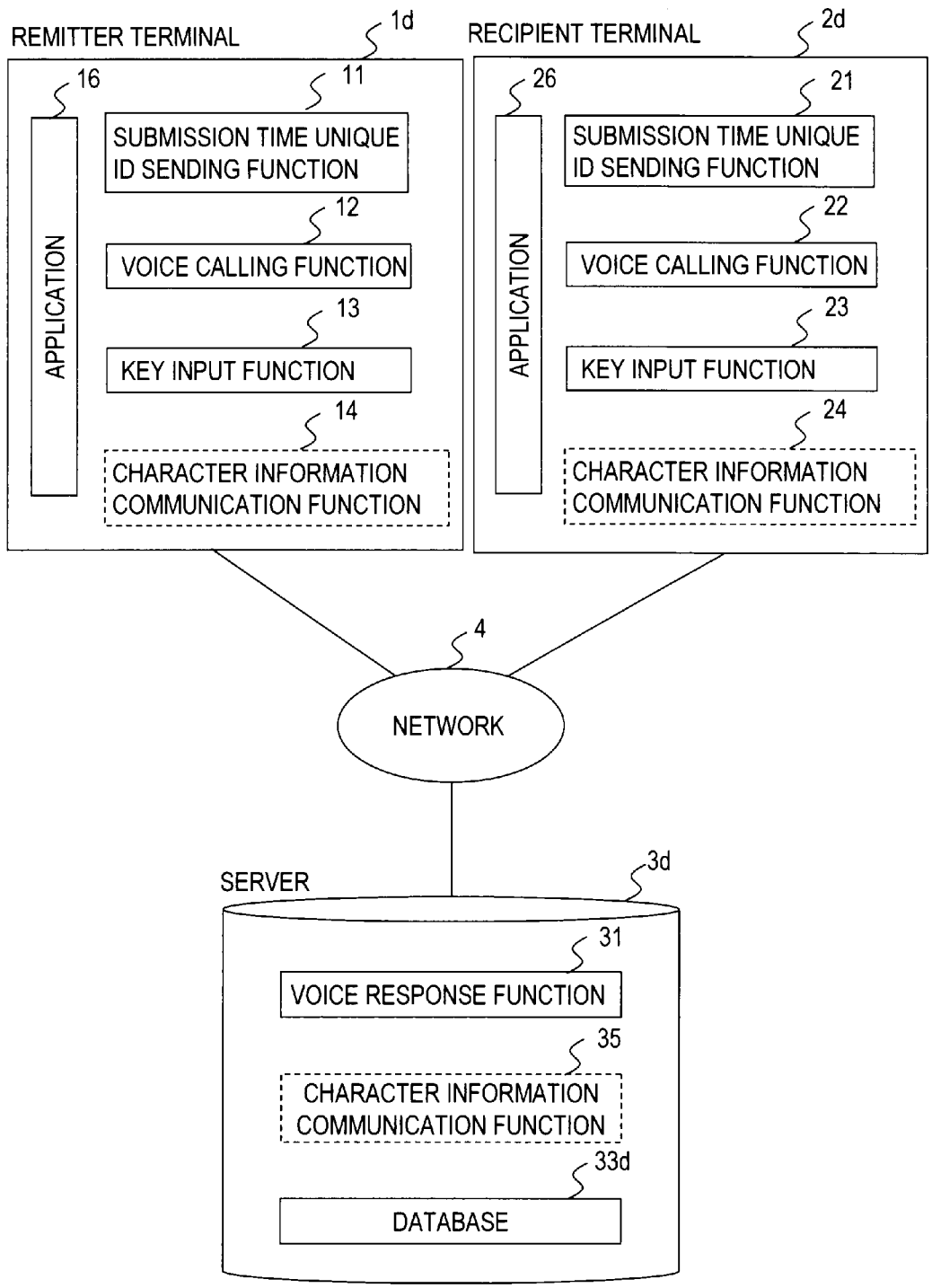
FIG. 20 is a block diagram showing a fourth embodiment of an electronic settlement system of the present invention.

FIG. 20 shows a fourth embodiment of an electronic settlement system of the present invention, and in the drawing, a component identical to the first and second embodiments is represented by an identical reference symbol, and the description is omitted except the necessary events.

1d denotes a remitter terminal, 2d denotes a recipient terminal, 3d denotes a server, and 4 denotes a network.

The remitter terminal 1d and the recipient terminal 2d are smartphones respectively provided at least with submission time unique ID sending functions 11 and 21, voice calling functions 12 and 22, key input functions 13 and 23, and applications 16 and 26 for an electronic settlement system.

The applications 16 and 26 provide a visual input interface (or a key input of a terminal) to a user. They also provide a function of sending a caller ID or information inputted by a user to the other party by driving the submission time unique ID sending functions 11 and 21 or the key input functions 13 and 23 and converting the information received from the other party to an expression format appropriate to offer a user. Specifically, for example, the following function is provided.

When a user launches the application 16 or 26, a menu screen is displayed on the smartphone, and the user selects a process and also inputs information necessary for the process. Here, the menu screen is to represent processing items, such as "deposit", "withdrawal", "balance inquiry", "history inquiry", "reverse remittance", and "forward remittance", as respectively different character information and image information in association with the processing items in advance.

After carrying out operations so far in a state of off line, the user carries out an operation to make a connection to the server 3d. Therefore, the user can carry out an input operation taking his/her time and also can avoid an input error due to an instant interruption of communication, so that the operability improves.

For example, in the event of forward remittance, when a connecting operation is made by the remitter, the application 16 drives the submission time unique ID sending function 11 to send the caller ID to the server 3d. Since information that can be expressed with numbers, such as a number corresponding to the processing item selected by the user from the menu, the inputted account number or remittance amount, can be digitally sent together with the caller ID, they are sent in conjunction. For example, in the event that a remitter having a caller ID of 00-0000-0000 remits 800 yen to a recipient having a unique ID of 1111, the application 16 may dial 00-0000-0000*1111*800. In this event, if the application dials and disconnects a call immediately after establishing the call, the server 3d can securely learn information of the ID (caller ID) of the remitter, the unique ID of the recipient, and the remittance amount even without responding an incoming call. Therefore, technically, it is possible to send and receive necessary information toll free. As a result, since the communication can be completed for a moment, it is possible to seek for a more inexpensive toll and suppression of the number of lines of the server 3d.

Instead of the key input functions 13 and 23 or together with the key input functions 13 and 23, the character information communication functions 14 and 24 may also be equipped to send and receive information necessary for the processes.

The server 3d is a computer device connectable to a network, provided at least with a voice response function 31 and a database 33d. The database 33d stores information regarding a user necessary for the processes. In the event that the remitter terminal 1d and the recipient terminal 2d are equipped with the character information communication functions 14 and 24, the server 3d is also equipped with the character information communication function 35.

The network 4 is made with a communication network that can transmit a voice signal between a user terminal and a server, for example, a public telephone network including a portable telephone network and the Internet (it should be noted that, in the event of the Internet, in order to secure the security, communication is carried out via a VPN by an IPsec or an SSL).

Figure 21:
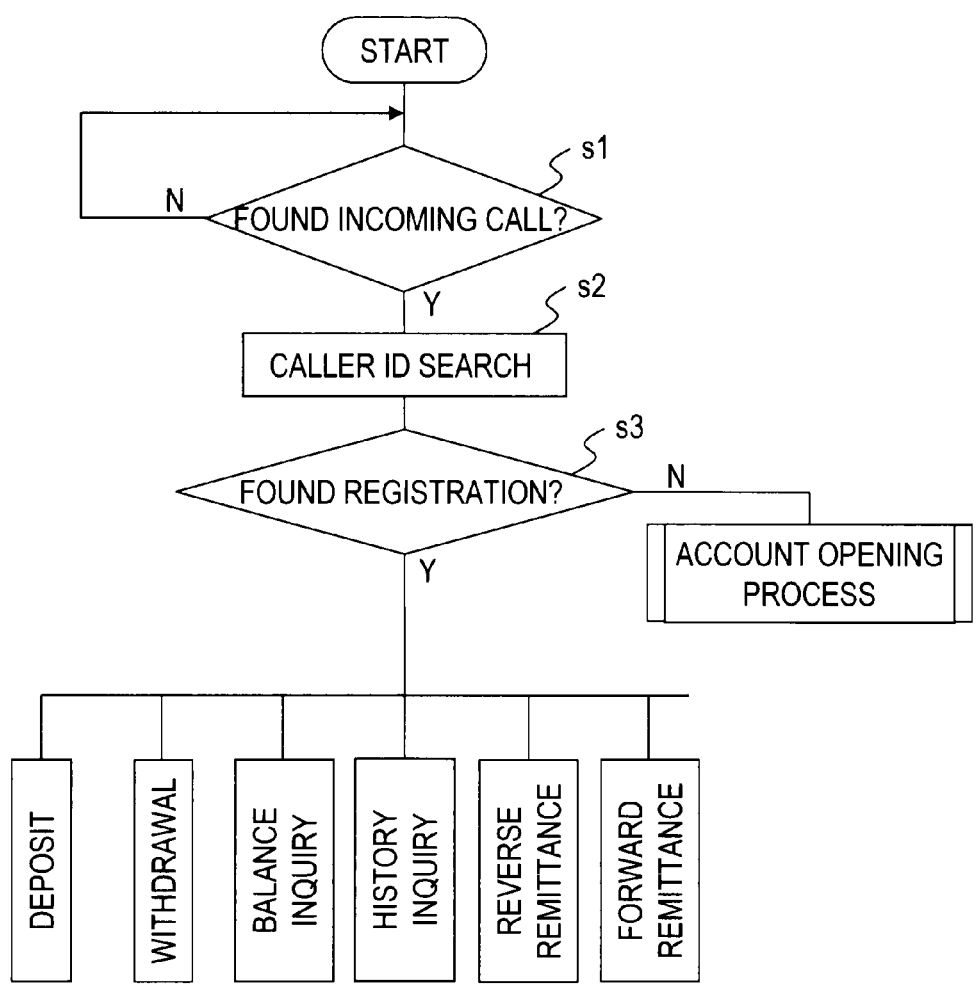
FIG. 21 is a flowchart of an initial process in a server of the fourth embodiment.
Figure 22:
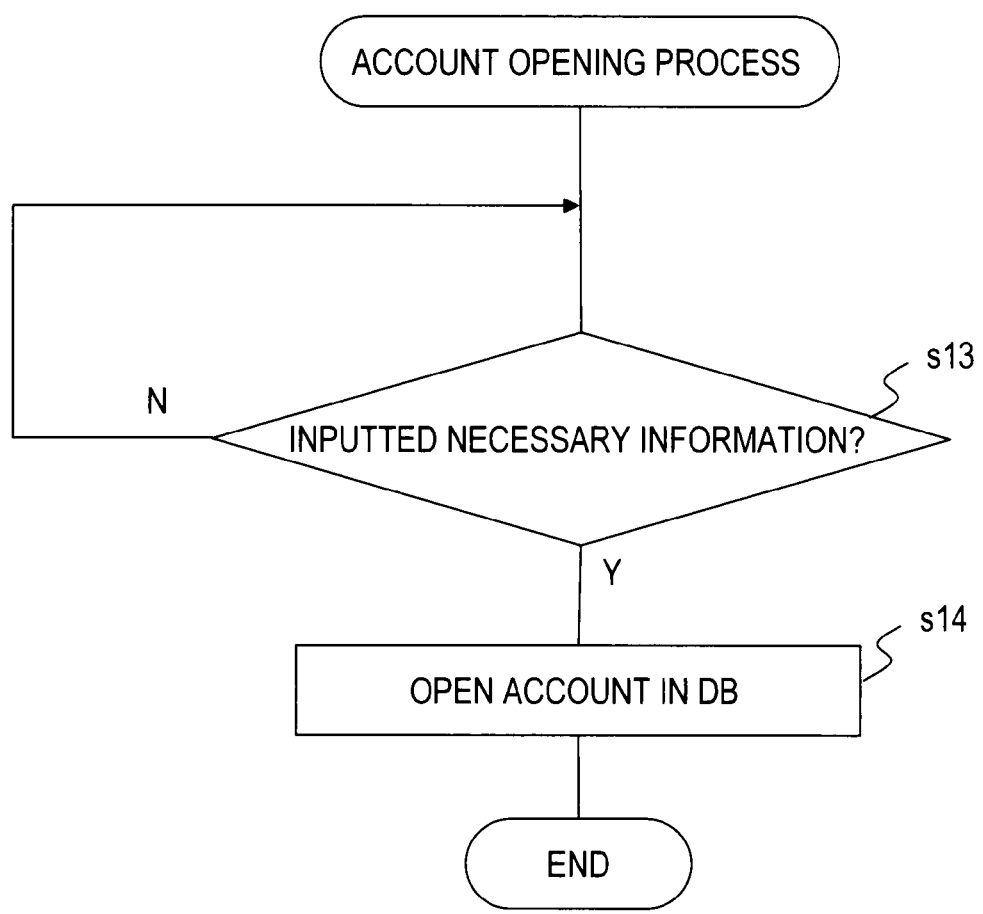
FIG. 22 is a flowchart of an account opening process in a server of the fourth embodiment.
Figure 23:
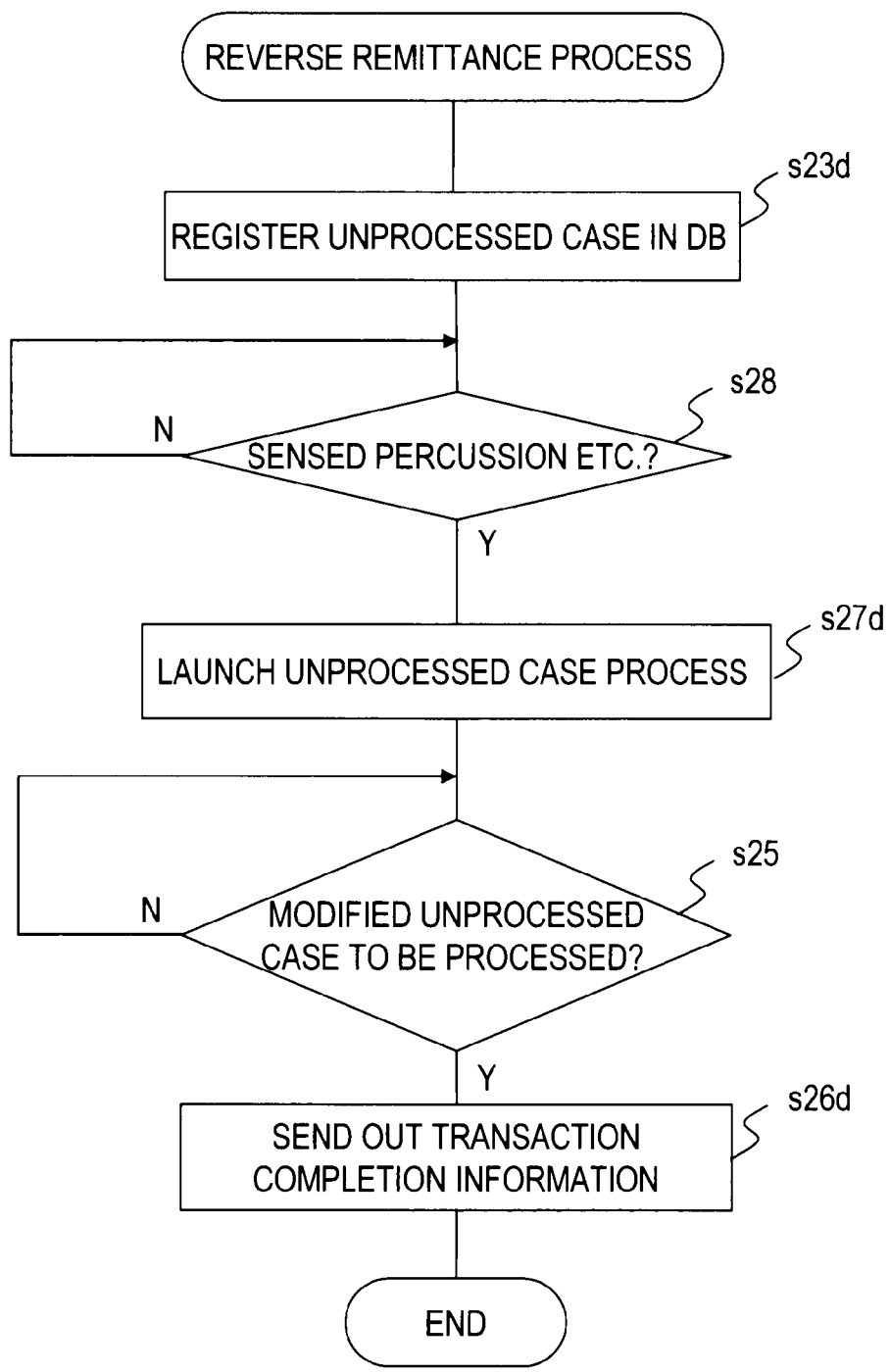
FIG. 23 is a flowchart of a reverse remittance process in a server of the fourth embodiment.
Figure 24:
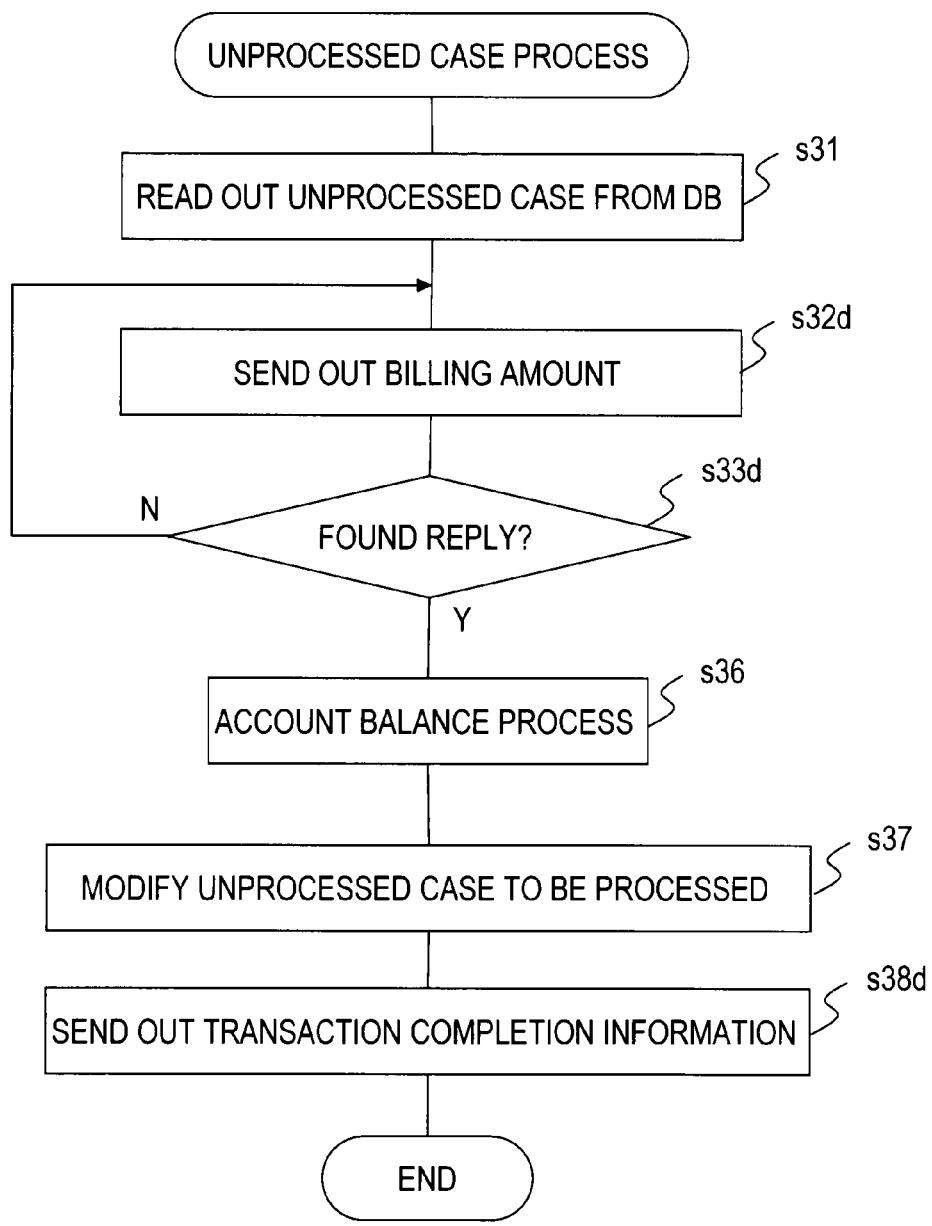
FIG. 24 is a flowchart of an unprocessed case (billing case) process in a server of the fourth embodiment.
Figure 25:
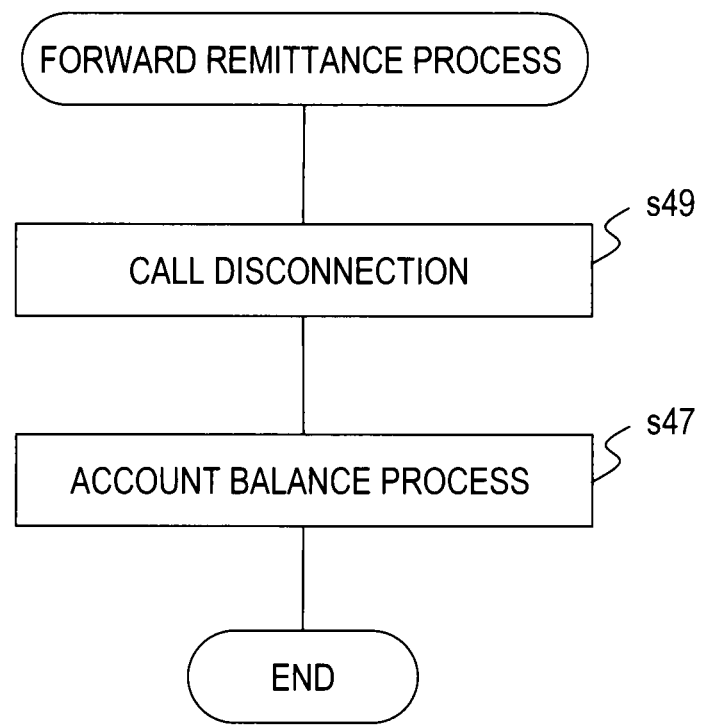
FIG. 25 is a flowchart of a forward remittance process in a server of the fourth embodiment.

FIGS. 21 through 25 show flows of various processes in the server 3d, that is, FIG. 21 shows a flow of an initial process, FIG. 22 shows a flow of an account opening process, FIG. 23 shows a flow of a reverse remittance process, FIG. 24 shows a flow of an unprocessed case (billing case) process, and FIG. 25 shows a flow of a forward remittance process. The server 3d is configured with respective means achieved by cooperation with a program, a CPU, a memory, and the like corresponding to the flows of these processes, and the above described voice response function 31 and database 33d.

A description is given below to a method of settlement by the present system together with details of the server.

[Initial Process]

As shown in FIG. 21, when the server 3d detects an incoming call from a user terminal via the voice response function 31 (s1), it investigates whether or not a caller ID included in the call request signal by the submission time unique ID sending function 11 or 21 of the user terminal is registered in the database 33d (s2), and if not registered (s3), it moves on to an account opening process as an incoming call from a terminal of a new user.

In contrast, if the caller ID is registered, it moves on to a selected process depending on a number or the like corresponding to the selected processing item included in a call request signal from the user terminal by the submission time unique ID sending functions 11 and 21 of the user terminal.

[Account Opening Process]

As shown in FIG. 22, in the event that all information necessary for an account opening is inputted from a user terminal (s13), the server 3d registers the inputted information in the database 33d in association with the caller ID of the user, thereby opening an account of the user (s14). At the beginning of opening an account, other information, for example, balance information and history information are naturally 0 or blank.

[Reverse Remittance Process and Unprocessed Case Process]

A case of selecting the "reverse remittance process" in a selection menu of the initial process is a case that a recipient requests monetary settlement, such as a payment of an expense associated with a product purchase, to a remitter through the present system.

Figure 26:
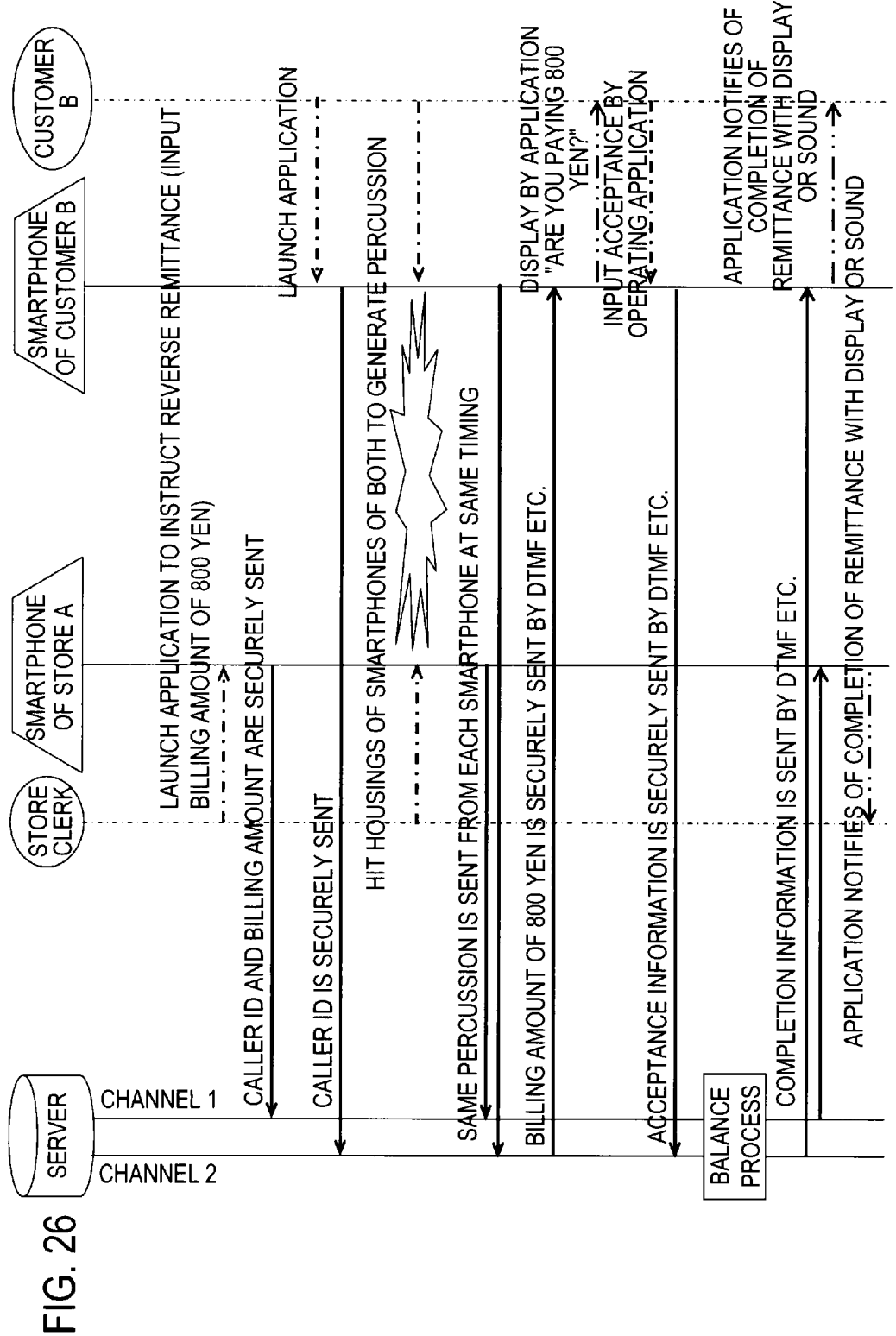
FIG. 26 is a sequence chart showing one example of a reverse remittance process and an unprocessed case process in the fourth embodiment.

A description is given below to a behavior in the event that the recipient is a store A that sells products and the recipient terminal 2d is a smartphone of the store A, and the remitter is a customer B that purchases a product from the store A and the remitter terminal 1d thereof is a smartphone, and further the network 4 is a public telephone network (including a portable telephone network) using a sequence chart of FIG. 26 together with flowcharts of FIGS. 23 and 24. In FIG. 26, an arrow in a solid line shows a flow of information between any terminal and the server and an arrow in a dash dotted line shows an operation to any terminal. Both the store (recipient) A and the customer (remitter) B are supposed to have completed the account opening process in advance.

At the time of a product purchase, a store clerk of the store (recipient) A launches an application 26 of a smartphone 2d and selects "reverse remittance" from a menu screen and inputs a billing amount (for example, 800 yen) to make a connection to the server 3d. The application 26 drives the submission time unique ID sending function 21 and dials the caller ID and the billing amount to securely send the information to the server 3d via a public telephone network or the Internet.

The server 3d that has received the call request signal from the smartphone 2d via the voice response function 31 carries out the initial process described above and registers unprocessed case information, in which the origin of billing is a user of the smartphone 2d that has selected the reverse remittance process, that is, the store A, the remittance amount is the billing amount, and the remitter is unknown, in the database 33d (s23d) to wait for an input of a signal from each smartphone (s28).

In contrast, the customer (remitter) B launches an application 16 of the smartphone 1d to make a connection to the server 3d. The application 16 drives the submission time unique ID sending function 11 to securely send the caller ID via the public telephone network.

In this state, after the store clerk of the store A and the customer B carry out a predetermined operation to the applications 26 and 16 of the respective smartphones 2d and 1d respectively, the housing of the smartphone 2d of the store clerk of the store A and the housing of the smartphone 1d of the customer B are percussed, for example. Thus, a same percussion is sent from the both smartphones to the server 3d at a same timing and the server 3d senses their percussion at the same time, thereby making it possible to identify the customer B as the remitter. In the server 3d, by determining an incoming ambient noise other than the percussion and by determining whether or not the locations of both are close by working the application with a GPS function to send location information to the server, it is possible to intensify the accuracy of matching the percussion. Since the location can be roughly determined from the connected base station information for a portable telephone and from the area code for a fixed line telephone, such information may also be utilized. An example of carrying out matching by a percussion of two smartphones is described here while matching may also be carried out by, for example, presenting a particular sound from a speaker of one of the smartphones to pick it up with a microphone of the other smartphone. Matching may also be carried out by infrared, NFC (near field communication), non-contact IC, static electricity, and terminal contact communication between respective smartphones or the like.

After identifying the remitter, the server 3d launches the unprocessed case (s27d) to read out the unprocessed case information from the database 33d (s31). Then, using the voice response function 31, it sends the billing amount corresponding to the unprocessed case information to the smartphone 1d of the customer B by DTMF (Dual-Tone Multi-Frequency) or the like (s32d) to wait for a reply (s33d).

When the smartphone 1d of the customer B receives the billing amount, the application 16 displays a message of, for example, "Are you paying 800 yen?" and an accept button on the screen of the smartphone 1d. When the customer B inputs acceptance, the application 16 drives the key input function 13 to reply the acceptance information to the server 3d with a DTMF sound or the like.

When receiving it via the voice response function 31, the server 3d updates the balance information in the database 33d corresponding to the caller ID of the smartphone 1d and the caller ID of the smartphone 2d in accordance with the billing amount. That is, it reduces the amount of the balance information in the database 33d corresponding to the caller ID of the smartphone 1d and increases the amount of the balance information in the database 33d corresponding to the caller ID of the smartphone 2d (s36).

After that, the server 3d modifies the unprocessed case information registered in the database 33d to be a processed one (s37) and also sends transaction completion information with a DTMF sound or the like using the voice response function 31 to the smartphone 1d (s38d). When the smartphone 1d receives the transaction completion information, the application 16 notifies the customer B of the transaction completion by a screen display or a sound.

Based on the modification of the unprocessed case information to be a processed one (s25), the server 3d sends transaction completion information with a DTMF sound or the like using the voice response function 31 to the smartphone 2d (s26d). When the smartphone 2d receives the transaction completion information, the application 26 notifies the store clerk of the store A of the transaction completion by a screen display or a sound.

Instead of updating the balance information in the database 33d, it may also be configured to settle by, for example, providing a telephone company with information concerning the remittance to add and offset it to a telephone bill for the next month of the customer B and the store A, respectively.

[Forward Remittance Process]

The case of selecting "forward remittance" in the selection menu of the initial process is a case of carrying out simple remittance (transfer) from a remitter to a recipient through the present system.

Figure 27:
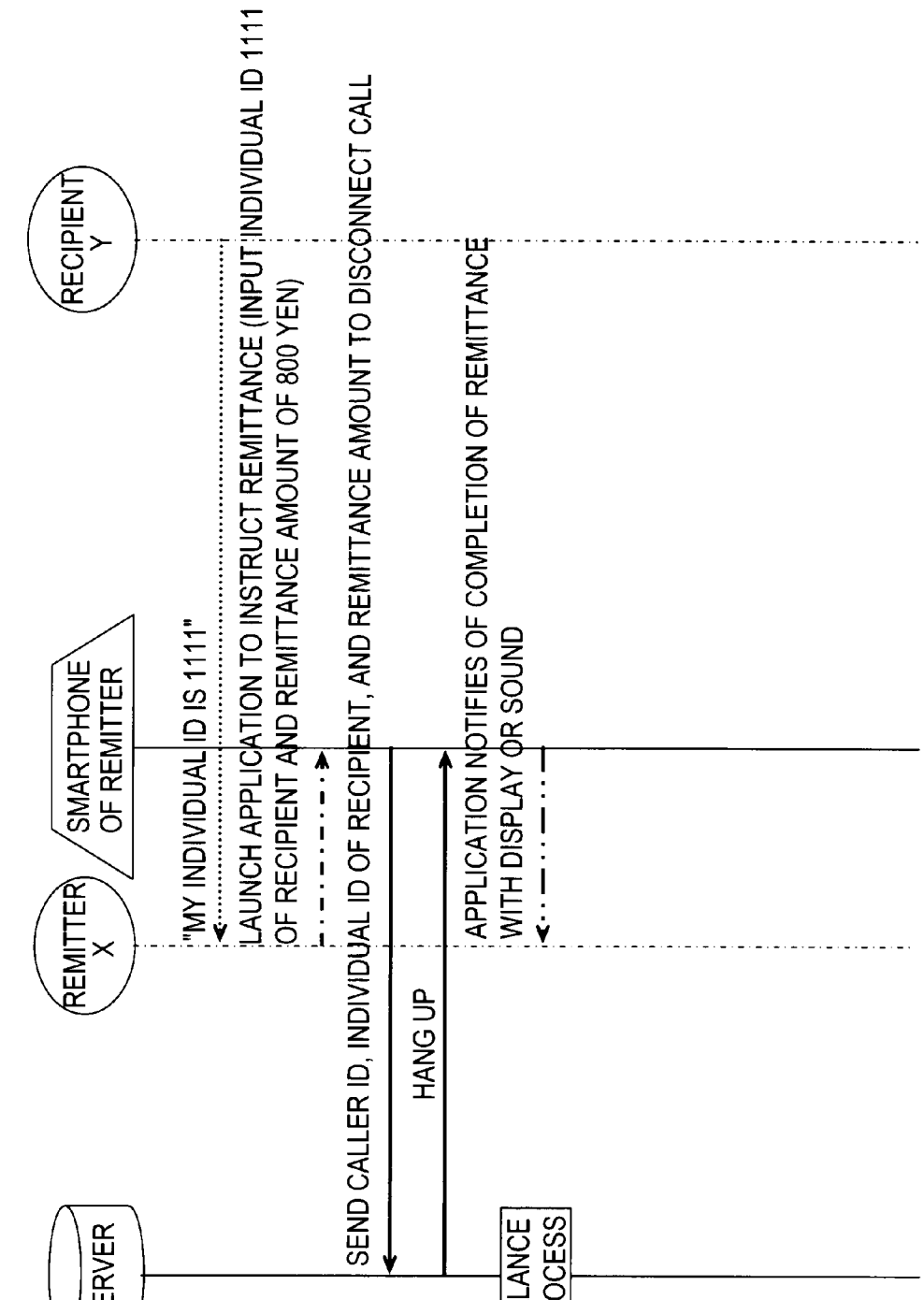
FIG. 27 is a sequence chart showing one example of a forward remittance process in the fourth embodiment.

A description is given below to a remittance behavior to a recipient (individual person) Y in the event that a remitter terminal 1d of a remitter (individual person) X is a smartphone using a sequence chart of FIG. 27 together with a flowchart of FIG. 25. In FIG. 27, an arrow in a solid line shows a flow of information between any terminal and the server, an arrow in a dash dotted line shows an operation to any terminal, and an arrow in a dotted line shows a direct conversation between the remitter and the recipient. Both the remitter X and the recipient Y are supposed to have completed the account opening process in advance.

At the time of remittance, the recipient Y tells an individual ID (for example, an account number of "1111") of him/herself to the remitter X by arbitrary means, such as in oral, an email, or a regular mail. The remitter X launches the application 16 of the smartphone 1d, selects "forward remittance" from the menu screen, and inputs the individual ID of the recipient Y and the remittance amount (for example, 800 yen) to make a connection to the server 3d. The application 16 drives the submission time unique ID sending function 11 and dials the caller ID, the individual ID of the recipient Y, and the remittance amount to disconnect the call immediately after establishing a call (s49). Thus, without responding the incoming call, the server 3d can securely learn information of the individual ID (caller ID) of the remitter X, the individual ID of the recipient Y, and the remittance amount. Then, the server 3d hangs up and also updates respective balance information in the database 33d corresponding to the caller ID of the smartphone 1d of the remitter X and the account number of the recipient Y. That is, it reduces the amount of the balance information in the database 33d corresponding to the caller ID of the smartphone 1d and increases the amount of the balance information in the database 33d corresponding to the account number of the recipient Y (s47). The application 16 of the smartphone 1d that has sensed the hanging up of the server 3d notifies the remitter X of the transaction completion by a screen display, sending of a mail, or the like. The server 3d may also notify the recipient Y of the remittance.

Instead of updating the balance information in the database 33d, it may also be configured to settle by, for example, providing a telephone company with information concerning the remittance to add and offset it to a telephone bill for the next month of the remitter X and the recipient Y.

Since [deposit process], [withdrawal process], [balance inquiry process], [history inquiry process], and the like are mostly similar to the event of the respective first and second embodiments except that the input of information by a user is carried out off line and that digitizable input information is collectively sent together with the caller ID, the description is omitted.

Fifth Embodiment

In the fourth embodiment, an application to be installed in a smartphone is considered to be, for example, available from a server in advance. In this event, by including a hash function f different for each download in the application to be downloaded, it is possible to intensify the security against viruses posing as an application.

A description is given to an example in the event of carrying out forward remittance given that a user utilizes a smartphone in which an application including a hash function f downloaded from a server is installed and the server also has the hash function f corresponding to the download in advance.

While in the fourth embodiment an example is described that the smartphone of the remitter dials the caller ID, the individual ID of the recipient, and the remittance amount to disconnect the call immediately after establishing the call, the call is not disconnected here to wait for a reply from the server. After receiving the caller ID, the recipient ID, and the remittance amount, the server sends a random number r to the remitter by DTMF, for example. The smartphone of the remitter receives this random number r and calculates f(r) to send it to the server by DTMF. The server calculates f(r) using the random number r having sent to the remitter and the hash function f having therein in advance and verifies it with f(r) received from the remitter, and only in the event that both are matched, performs the balance process. If the application installed in the smartphone is illegal, it does not have f and f(r) of both are not matched, so that this enables to secure the security.

Sixth Embodiment

In the reverse remittance process and the forward remittance process of the first and second embodiments, the remitter is made input confirmation information indicating to accept the remittance and the server 3 (or 3*b*) verifies it with the information registered in the database 33 (or 33*b*), thereby confirming the authenticity of the indication of the intention. At that occasion, although details of the confirmation information indicating the intention to accept the remittance, i.e., the security policy is basically allowed to be fixed, it is possible to intensify the security against illegal accesses, viruses, and the like by enabling to select details conforming the remittance conditions.

With that, it is considered to enable a user to select and set up a security policy conforming the remittance conditions prior to utilization of the system.

Specifically, it is considered to enable to set up a security policy conforming the remittance conditions by, for example, adding a processing item of "security policy setup" to the menu guidance (or the menu screen) sent out by the server to a user terminal in the initial process to let a user select it. For example, a security policy can be set up, such as "authentication is carried out by voiceprint authentication if the remittance amount is X yen or more" or "a second password is requested when the remittance destination is unregistered".

Seventh Embodiment

In the first embodiment, the authentication by voiceprint information is carried out by seeking a speech of a predetermined keyword to the user in the voice guidance sent out by the server to let the user speak the keyword. It is possible to intensify the security against voiceprint posing by making this predetermined keyword seeking a speech randomly different for each opportunity of authentication. With that, in the seventh embodiment, a plurality of keywords and voiceprints of a user having pronounced them are registered in advance in the server (database) for each user to apply by extracting a keyword randomly from them for each opportunity of authentication. In this event, the registration of the plurality of keywords and the voiceprints of a user having pronounced them in the server may be carried out, for example, at the time of an account opening, or the server may also request a speech of some keyword to a user at the end of a transaction at a certain time to register the spoken keyword in addition in series.

To a request of speaking a predetermined keyword (keyword 1) by the server, authentication may also be carried out by, not letting a user speak the keyword 1, but speak another predetermined keyword (keyword 2) corresponding to the keyword 1. In such a manner as well, it is possible to intensify the security against voiceprint posing. In this event, both the server and the user are necessary to memorize the keyword 1 and the keyword 2 in association.

When errors in voiceprint authentication become a predetermined times or more, it may also be configured to stop utilization.

In addition, by setting an expiration date to a keyword, the keyword may also be configured to be updated for each date.

Eighth Embodiment

Figure 28:
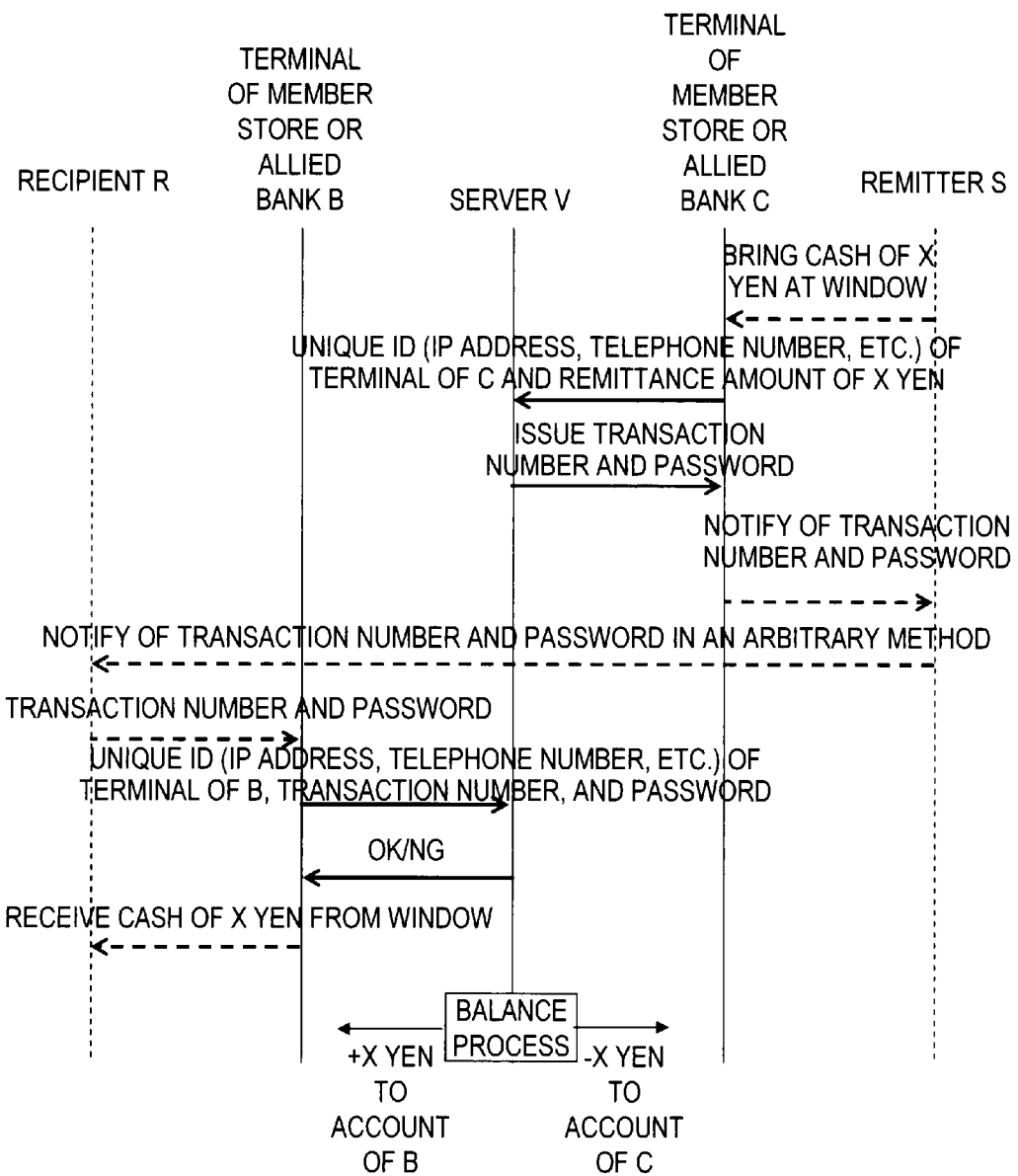
FIG. 28 is a sequence chart showing an example of the event that both a remitter and a recipient do not have a terminal in a remittance process in an eighth embodiment.

In the event of carrying out international remittance, a remitter and a recipient are not always in an environment capable of directly utilizing a terminal. However, even if both the remitter and the recipient do not have a terminal device, secure remittance is enabled by applying a remittance method of the present invention. FIG. 28 is a sequence example of applying a remittance method of the present invention in the event that a remitter S in an a country remits cash of X yen to a recipient R in a b country. In this sequence example, international remittance is carried out via a server V that can be commonly utilized internationally between a member store or an allied bank C of the a country and a member store or an allied bank B of the b country in the electronic settlement system of the present invention, and the remitter S and the recipient R carry out giving and receiving cash via the respective member store or the allied bank of the own country.

Specifically, firstly, the remitter S brings and passes cash of X yen to a member store or an allied bank C of the a country. C carries out a forward remittance process using an own terminal. At this time, the terminal of C sends an own unique ID (an IP address, a telephone number, or the like) and a remittance amount of X yen to the server V. At this time, there is no need to send the unique ID of a terminal of the member store or the allied bank B of the b country. The server V issues a transaction number and a password to C. The C notifies the remitter S of the transaction number and the password. The remitter S notifies the recipient R of the transaction number and the password in an arbitrary method. The recipient R offers the transaction number and the password to the member store or the allied bank B of the b country. B notifies the server V of an own unique ID, the transaction number, and the password using an own terminal. The server V carries out authentication of the terminal of B and verification of the transaction number and the password and replies the verification result (OK or NG) to B. In the event that the verification result is OK, B passes cash of X yen to the recipient R and the server V reduces the amount for X yen of the balance of the account of C that has received cash of X yen from S and increases the amount for X yen of the balance of the account of B that has passed cash of X yen to R to adjust the income and the expenditure of B and C, which are intermediaries, to zero yen.

Figure 29:
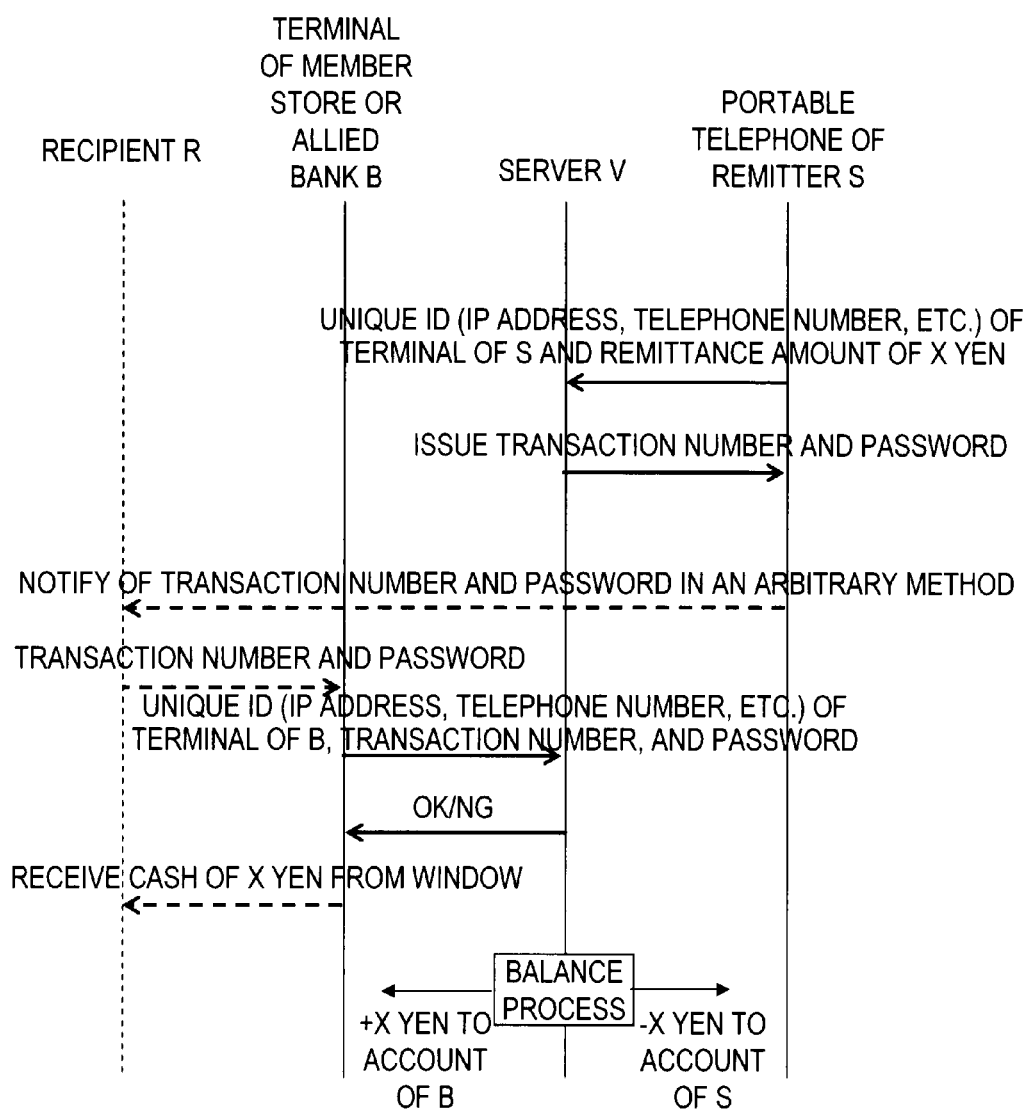
FIG. 29 is a sequence chart showing an example of the event that only a remitter has a terminal in a remittance process in the eighth embodiment.

FIG. 29 shows a sequence example in the event that the recipient R does not have a terminal device while the remitter S has a terminal device (for example, a portable telephone). In this event, the remitter S carries out a forward remittance process using the own terminal. At this time, the terminal of the remitter S sends the own unique ID (an IP address, a telephone number, or the like) and the remittance amount of X yen to the server V. The server V issues a transaction number and a password to the remitter S. The remitter S notifies the recipient R of the transaction number and the password in an arbitrary method. The processes after that are similar to the event of FIG. 28.

Figure 30:
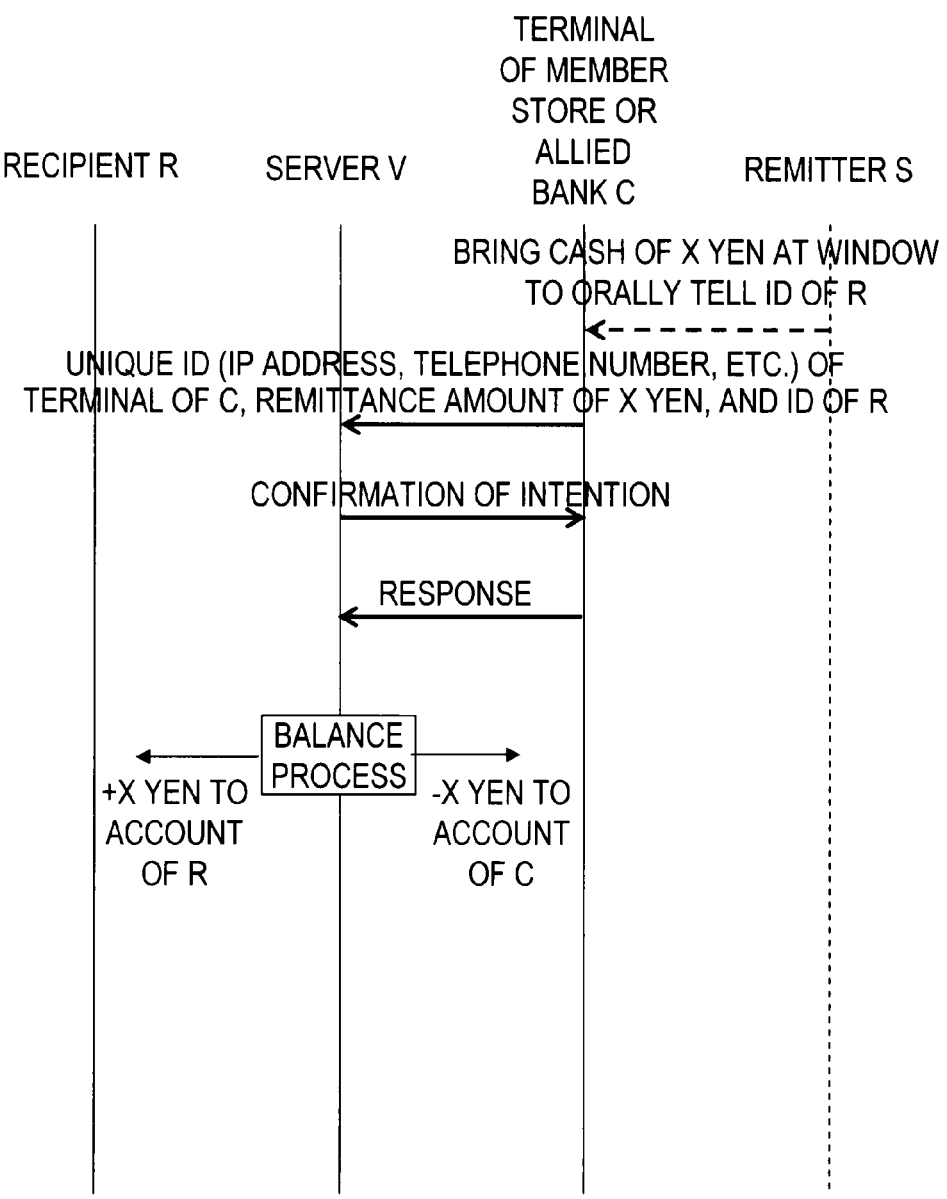
FIG. 30 is a sequence chart showing an example of the event that a remitter does not have a terminal and a recipient has an account in a remittance process in the eighth embodiment.

FIG. 30 shows a sequence example in the event that the remitter S does not have a terminal device while the recipient R has an account. In this event, firstly, the remitter S brings and passes cash of X yen to a member store or an allied bank C of the a country and also orally tells the unique ID (account number) of the recipient R. C carries out a forward remittance process using an own terminal. At this time, the terminal of C sends the own unique ID (an IP address, a telephone number, or the like), the remittance amount of X yen, and the unique ID (account number) of R to the server V. Then, in accordance with a regular forward remittance process, as the authenticity of the intention is confirmed after going through the confirmation of intention to C and the response from C, a balance process is carried out.

As described above, according to the remittance method of the eighth embodiment, it is possible to achieve international remittance that does not require a terminal device or an ATM card to both the remitter and the recipient, is high in commercial security, and is inexpensive.

DESCRIPTION OF REFERENCE NUMERALS 1, 1b, 1d: Remitter User Terminal (Remitter Terminal),
2, 2b, 2c, 2d: Recipient User Terminal (Recipient Terminal),
3, 3b, 3d: Server,
4, 4b: Network,
11, 21: Submission Time Unique ID Sending Function,
12, 22: Voice Calling Function,
13, 23: Key Input Function,
14, 24: Character Information Communication Function,
16, 26: Application, 25: Database, 31: Voice Response Function, 32: Voiceprint Verification Function, 33, 33b, 33d: Database, 34: Incoming Call Response Function, 35: Character Information Communication Function.

What is claimed is:

1. An electronic settlement method between user terminals at least provided with a function of sending a unique identification ID of a user to a connection destination at a submission time, the method being carried out via a server provided at least with a database storing at least balance information of the user in association with the unique identification ID of the user and the method comprising:
   a step, by circuitry of a remitter user terminal, of sending a unique identification ID of a remitter user to the server by connecting the server;
   a step, by circuitry of the server, of receiving a forward remittance request including at least the unique identification ID of the remitter user, a unique identification ID of a recipient user by voice information, and a remittance amount by voice information from the remitter user terminal;
   a step, by the circuitry of the server, of sending by voice information a return request, which relates to confirmation information indicating an intention to accept remittance to the forward remittance request and includes at least information regarding a transaction amount according to the forward remittance request and information regarding the recipient user, to the remitter user terminal having carried out the forward remittance request;
   a step, by the circuitry of the server, of receiving the confirmation information indicating an intention to accept remittance to the forward remittance request from the remitter user terminal; and
   a step, by the circuitry of the server, of updating balance information corresponding to the unique identification ID of the remitter user and the unique identification ID of the recipient user in accordance with the remittance amount,
   wherein the unique identification ID is information that allows to identify a user terminal.

2. The electronic settlement method of claim 1, wherein,
   in the event of detecting an access from a user terminal corresponding to the unique identification ID of the recipient user included in the forward remittance request after the forward remittance request receipt and before the balance update, the circuitry of the server performs the steps of:
   sending by voice information a return request, which relates to confirmation information indicating an intention to accept money reception to the forward remittance request and includes at least information regarding the remitter user and a transaction amount according to the forward remittance request, to the user terminal; and
   receiving the confirmation information indicating the intention to accept the money reception to the forward remittance request from a recipient user terminal.

* * * * *